US011201962B2

(12) United States Patent
Schenone et al.

(10) Patent No.: US 11,201,962 B2
(45) Date of Patent: Dec. 14, 2021

(54) CALLING ON A MULTI-DISPLAY DEVICE

(71) Applicant: Microsoft Technology Licensing, LLC, Redmond, WA (US)

(72) Inventors: Scott D. Schenone, Seattle, WA (US); Otso Joona Casimir Tuomi, Seattle, WA (US); Eduardo Sonnino, Seattle, WA (US); Spencer Lee Davis, Columbus, OH (US); Sergio Eduardo Rodriguez Virgen, Bothell, WA (US); T J Rhoades, Seattle, WA (US); Panos Costa Panay, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/719,802

(22) Filed: Dec. 18, 2019

(65) Prior Publication Data

US 2021/0099570 A1 Apr. 1, 2021

Related U.S. Application Data

(60) Provisional application No. 62/909,220, filed on Oct. 1, 2019.

(51) Int. Cl.
*H04M 1/72* (2021.01)
*H04M 1/72454* (2021.01)
(Continued)

(52) U.S. Cl.
CPC ...... *H04M 1/72454* (2021.01); *G06F 3/0488* (2013.01); *G06F 3/04847* (2013.01);
(Continued)

(58) Field of Classification Search
CPC ........... H04M 1/72454; H04M 1/0216; H04M 1/0243; H04M 1/0266; G06F 3/04847; G06F 3/0488
See application file for complete search history.

(56) References Cited

U.S. PATENT DOCUMENTS

| 6,069,648 A | 5/2000 | Suso et al. |
| 7,536,650 B1 | 5/2009 | Robertson et al. |

(Continued)

FOREIGN PATENT DOCUMENTS

| CN | 106681641 A | 5/2017 |
| CN | 107040719 A | 8/2017 |

(Continued)

OTHER PUBLICATIONS

Henry, "How to Optimize Apps for Folding Devices: Developing for the Multiscreen Form Factor", Retrieved from: https://insights.samsung.com/2019/01/14/how-to-optimize-apps-for-folding-devices-developing-for-the-multiscreen-form-factor/, Jan. 14, 2019, 9 Pages.

(Continued)

*Primary Examiner* — Md K Talukder
(74) *Attorney, Agent, or Firm* — Alleman Hall Creasman & Tuttle LLP

(57) ABSTRACT

Examples that relate to calling on a computing device are disclosed. One example provides a computing device, comprising, a first display a second display, a sensor system a logic subsystem and a storage subsystem comprising instructions executable by the logic subsystem to output, via one or both of the first display and the second display, a notification of an incoming phone call at the computing device, and based on output from the sensor system indicating a relative angle between the first display and the second display being changed to an angle greater than a predetermined angle, answer the incoming phone call.

8 Claims, 30 Drawing Sheets

(51) Int. Cl.
  *H04M 1/02* (2006.01)
  *G06F 3/0484* (2013.01)
  *G06F 3/0488* (2013.01)
(52) U.S. Cl.
  CPC ....... *H04M 1/0216* (2013.01); *H04M 1/0243* (2013.01); *H04M 1/0266* (2013.01); *H04M 2250/12* (2013.01); *H04M 2250/16* (2013.01)

(56) References Cited

U.S. PATENT DOCUMENTS

| | | | |
|---|---|---|---|
| 8,194,001 B2* | 6/2012 | Miller | G06F 1/1618 |
| | | | 345/1.3 |
| 8,330,347 B2 | 12/2012 | Kee et al. | |
| 8,504,936 B2 | 8/2013 | Gimpl et al. | |
| 8,599,106 B2 | 12/2013 | Gimpl et al. | |
| 8,890,802 B2* | 11/2014 | Case, Jr. | G06F 1/1616 |
| | | | 345/156 |
| 9,207,717 B2 | 12/2015 | Sirpal et al. | |
| 9,478,124 B2 | 10/2016 | Henty | |
| 9,489,078 B2* | 11/2016 | Seo | G06F 3/1431 |
| 9,524,030 B2* | 12/2016 | Modarres | H04M 1/0268 |
| 10,048,827 B2 | 8/2018 | Gimpl et al. | |
| 10,204,592 B1* | 2/2019 | Trim | H04N 1/6075 |
| 10,291,873 B2 | 5/2019 | Hattar et al. | |
| 10,306,060 B1 | 5/2019 | Ellis et al. | |
| 2006/0107226 A1 | 5/2006 | Matthews et al. | |
| 2010/0321275 A1* | 12/2010 | Hinckley | G06F 1/1654 |
| | | | 345/1.3 |
| 2011/0003587 A1 | 1/2011 | Belz et al. | |
| 2011/0143769 A1 | 6/2011 | Jones et al. | |
| 2012/0081309 A1 | 4/2012 | Sirpal et al. | |
| 2012/0084680 A1 | 4/2012 | Gimpl et al. | |
| 2012/0084710 A1 | 4/2012 | Sirpal et al. | |
| 2012/0084720 A1 | 4/2012 | Sirpal et al. | |
| 2013/0080956 A1 | 3/2013 | Sirpal et al. | |
| 2015/0067550 A1 | 3/2015 | Shin | |
| 2015/0100914 A1 | 4/2015 | Guan | |
| 2015/0365590 A1 | 12/2015 | Ishizuka | |
| 2015/0370322 A1 | 12/2015 | Gustafson | |
| 2016/0062792 A1 | 3/2016 | Yuan et al. | |
| 2016/0349974 A1 | 12/2016 | Louch | |
| 2017/0052698 A1* | 2/2017 | Seo | G06F 1/1616 |
| 2018/0129459 A1* | 5/2018 | Sylvan | G06F 3/167 |
| 2018/0332205 A1 | 11/2018 | Hawthorne et al. | |
| 2019/0042066 A1* | 2/2019 | Kim | G06F 3/04817 |
| 2019/0056844 A1* | 2/2019 | Kang | G06F 1/1677 |
| 2019/0310720 A1* | 10/2019 | Angelevski | H04M 1/0243 |
| 2019/0369830 A1 | 12/2019 | Alonso Ruiz et al. | |
| 2021/0096611 A1* | 4/2021 | Schenone | G06F 1/1677 |
| 2021/0096732 A1 | 4/2021 | Sonnino et al. | |

FOREIGN PATENT DOCUMENTS

| | | |
|---|---|---|
| EP | 2674834 A2 | 12/2013 |
| EP | 3291523 A1 | 3/2018 |
| WO | 2010028406 A1 | 3/2010 |
| WO | 2020080639 A1 | 4/2020 |

OTHER PUBLICATIONS

Hinckley, et al., "Codex: A Dual Screen Tablet Computer", In Proceedings of the SIGCHI Conference on Human Factors in Computing Systems., Apr. 9, 2009, pp. 1933-1942.

Khalilbeigi, et al., "FoldMe: Interacting with Double-sided Foldable Displays", In the Proceedings of 6th International Conference on Tangible, Embedded and embodied Interaction., Feb. 19, 2012, pp. 33-40.

Patel, "Sprint's Kyocera Echo Dual-creen Android Phone Announced, We Go Handson (update)", Retried from: https://www.engadget.com/2011/02/07/sprints-kyocera-echo-dual-screen-android-phone-announced-we-go/, Feb. 7, 2011, 19 Pages.

Seifert, Dan, "ZTE's Axon M has Two Screens and a Hinge", Retrieved from: https://www.theverge.com/circuitbreaker/2017/10/17/16486484/zte-axon-m-dual-screen-phone-announcement-hands-on, Oct. 17, 2017, 04 Pages.

Spence, Ewan, "Microsoft Confirms Innovative Approach to New Dual-Screened Surface Devices", Retrieved From: https://www.forbes.com/sites/ewanspence/2019/10/13/microsoft-surface-duo-surface-neo-new-leak-feature-specs-patent-dual-screen-hinge/#52a3d5e7462b, Oct. 13, 2019, 3 Pages.

Spoonauer, Mark, "Galaxy Fold Review: The Future Is (Almost) Here", Retrieved from: https://web.archive.org/web/20191001215733/https:/www.tomsguide.com/reviews/samsung-galaxy-fold, Oct. 1, 2019, 24 Pages.

"Non-Final Office Action Issued in U.S. Appl. No. 16/717,988", dated Oct. 28, 2020, 24 Pages.

"International Search Report and Written Opinion Issued in PCT Application No. PCT/US2020/042435", dated Oct. 5, 2020, 13 Pages.

"International Search Report and Written Opinion Issued in PCT Application No. PCT/US2020/048965", dated Nov. 16, 2020, 15 Pages.

"Final Office Action Issued in U.S. Appl. No. 16/717,988", dated Feb. 22, 2021, 26 Pages.

"International Search Report and Written Opinion Issued in PCT Application No. PCT/US2020/042434", dated Dec. 21, 2020, 24 Pages.

"Non Final Office Action Issued in U.S. Appl. No. 16/717,988", dated Aug. 20, 2021, 36 Pages.

* cited by examiner

CALLING ON A MULTI-DISPLAY DEVICE

CROSS REFERENCE TO RELATED APPLICATIONS

This application claims priority to U.S. Provisional Patent Application Ser. No. 62/909,220, filed Oct. 1, 2019, the entirety of which is hereby incorporated herein by reference for all purposes.

BACKGROUND

Some mobile computing devices support the ability to place and receive telephone calls. Such mobile devices may be provided in a variety of form factors.

SUMMARY

Examples that relate to calling on a computing device are disclosed. One example provides a computing device comprising a first display, a second display, a sensor system, a logic subsystem, and a storage subsystem comprising instructions executable by the logic subsystem to output, via one or both of the first display and the second display, a notification of an incoming phone call at the computing device, and based on output from the sensor system indicating a relative angle between the first display and the second display being changed to an angle greater than a predetermined angle, answer the incoming phone call.

Another example provides, at a computing device, a method comprising receiving an incoming call. The method comprises, based at least on output from a sensor system of the computing device indicating a first relative angle between a first display of the computing device and a second display of the computing device, causing operation of the computing device in a peek mode in which an outer edge portion of one of the first display and the second display is active, the peek mode displaying a first calling user interface. The method further comprises, based at least on output from the sensor system indicating a second relative angle between the first display and the second display, causing operation of the computing device in a two-display mode in which both of the first display and the second display are active, the second relative angle being greater than the first relative angle, and the two-display mode displaying a second calling user interface that is different than the first calling user interface.

Another example provides a computing device comprising a first portion comprising a first display and a speaker, a second portion comprising a second display and a telephone receiver, a sensor system, a logic subsystem, and a storage subsystem comprising instructions executable by the logic subsystem to, in response at least to receiving user interaction regarding a phone call at the first portion, output, via the first display, a notification indicating that the telephone receiver is unavailable when conducting the phone call using the first display as an active display. The instructions are further executable to, in response at least to receiving a user input, transfer a user interface for conducting the phone call from the first display to the second display.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Some mobile computing devices support the ability to place and receive telephone calls. Mobile devices that support calling may be provided in a variety of form factors. For example, a mobile device may include a single display, or two displays that may be folded relative to each other via a hinge mechanism. Mobile devices that include two displays may be usable in a variety of states. For example, a two-display mobile device may be opened such that both displays are visible to a user. In another state, the displays may be folded against each other such that one display faces the user and the other faces away from the user. The operation of the mobile device may be adapted based on these and other potential states.

Adapting operation of a mobile device based on its physical state may pose challenges, however. For example, it may be desirable to tailor device functions to different physical states, and to selectively disable functions to conserve power. This may be at odds with providing a consistent user experience across device states, particularly with respect to providing a consistent yet adaptive user interface (UI). Further, certain device functions may be more amenable to certain states than others. For example, a two-display device that includes a cell phone receiver at one display and not at the other may be more amenable to conducting phone calls using the receiver with the receiver side display held against a user's face, rather than with the other display.

Accordingly, examples are disclosed that relate to handling phone calls on a multi-display computing device, such as a two-display computing device. The computing device outputs various user interfaces for calling based on its current pose and operating state. Further, user interface cues are provided that unobtrusively guide a user to operate the computing device in states more amenable to conducting phone calls.

Figure 1A:
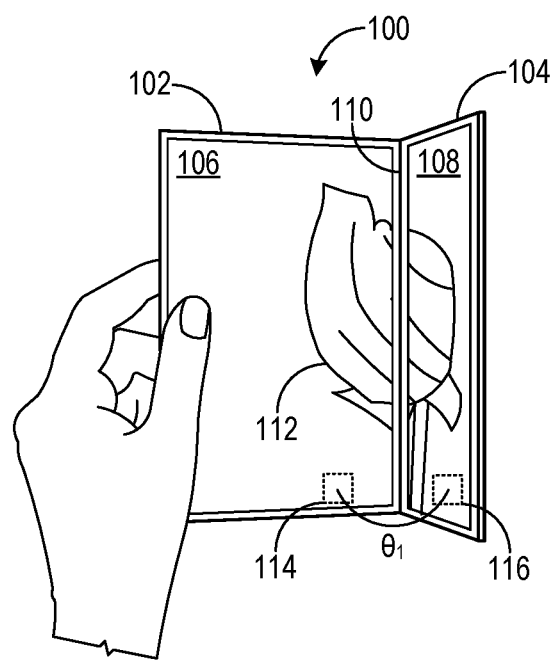
FIGS. 1A-1B show an example multi-display computing device held in different poses.
Figure 1B:
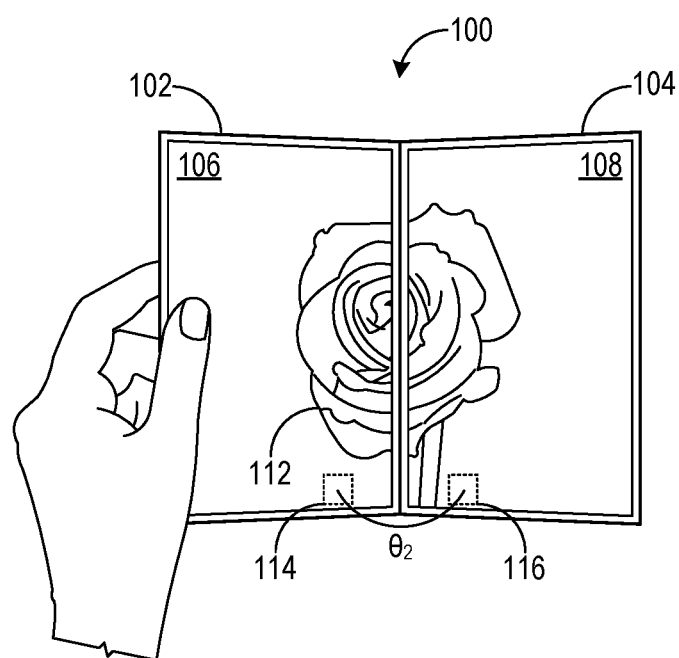

FIGS. 1A-1B show respective states of an example computing device 100. Computing device 100 includes a first portion 102 and a second portion 104 that respectively include a first display 106 and a second display 108. A hinge 110 arranged between first and second portions 102 and 104 enables the relative orientation between the portions and their displays to be adjusted by rotating one or both portions about the hinge. This relative orientation is represented in FIGS. 1A-1B by a variable angle θ measured between the surfaces of first and second portions 102 and 104. In the state shown in FIG. 1A, first and second portions 102 and 104 form an acute angle $θ_1$, whereas in the state shown in FIG. 1B the first and second portions are further rotated away from each other to form an obtuse angle $θ_2$. First and second portions 102 and 104 may be rotatable throughout any suitable range of angles. Computing device 100 may take any suitable form, including but not limited to various mobile devices (e.g., smartphone, tablet, laptop).

Computing device 100 may be configured to determine the relative orientation between first and second portions 102 and 104, and to adjust a function of the computing device based on the relative orientation. In the example depicted in FIGS. 1A and 1B, computing device 100 outputs via first and second displays 106 and 108 an image of a rose 112 whose level of bloom increases as angle θ between first and second portions 102 and 104 increases. As seen in FIG. 1A, rose 112 is shown in a relatively unbloomed state based on the acute angle $θ_1$, whereas in FIG. 1B the rose is shown in a relatively bloomed state based on the obtuse angle $θ_2$. Computing device 100 may continuously animate rose 112 as progressively blooming, as first and second portions 102 and 104 are rotated farther apart, and likewise may animate the rose as progressively de-blooming as the portions are brought closer together.

Figure 2A:
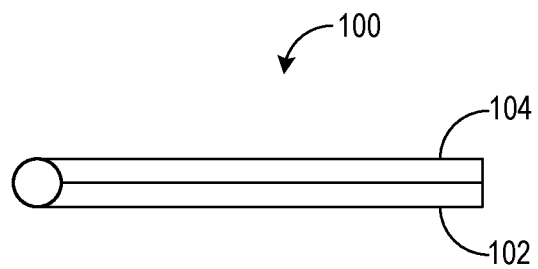
FIGS. 2A-2C show example orientations between first and second portions of the computing device of FIGS. 1A-1B.
Figure 2B:
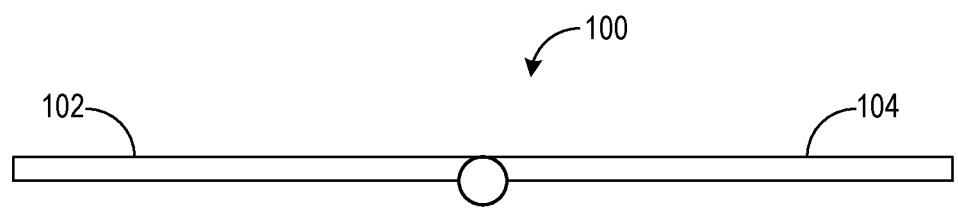
Figure 2C:
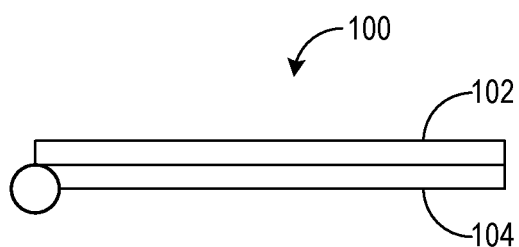

FIGS. 2A-2C show other relative orientations between first portion 102 and second portion 104. In FIG. 2A, computing device 100 is in a fully closed state with first and second portions 102 and 104 facing in opposition. In the fully closed state, first and second displays 106 and 108 may not be visible to a user. In FIG. 2B, computing device 100 is opened such that first and second portions 102 and 104 face in a substantially common direction, with both first and second displays 106 and 108 being visible to a user. In FIG. 2C, first portion 102 is folded behind second portion 104, such that one of the first and second portions is visible to a user.

Computing device 100 may tailor the output of first display 106 and/or second display 108 to each of the states in FIGS. 2A-2B. For example, in the state illustrated in FIG. 2A, both of first and second displays 106 and 108 may be disabled. In the state illustrated in FIG. 2B, both of first and second displays 106 and 108 may be enabled, as both displays are visible. In the state illustrated in FIG. 2C, first display 106 may be disabled due to its occlusion by second portion 104, when computing device 100 is held such that the second portion faces a user. Where computing device 100 is held such that first portion 102 is visible, second display 108 of second portion 104 may be disabled. Operation of computing device 100 in such examples where one, and not both, of first and second displays 106 and 108 are enabled and/or visible is referred to herein as "flip mode".

Figure 3A:
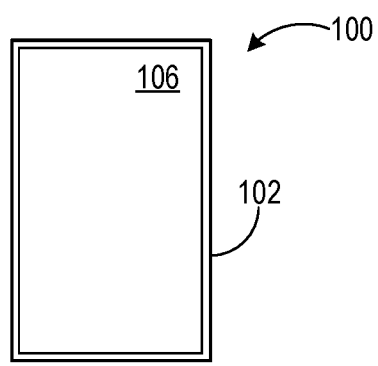
FIGS. 3A-3D show various further example poses for the computing device of FIGS. 1A-1B.
Figure 3B:
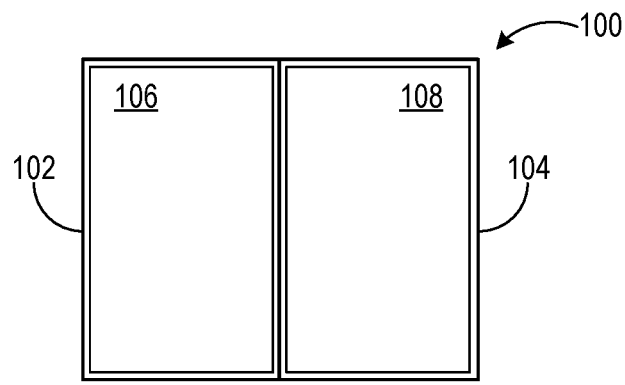
Figure 3C:
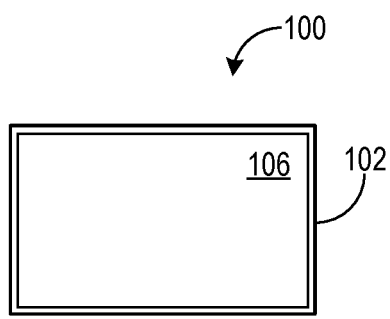
Figure 3D:
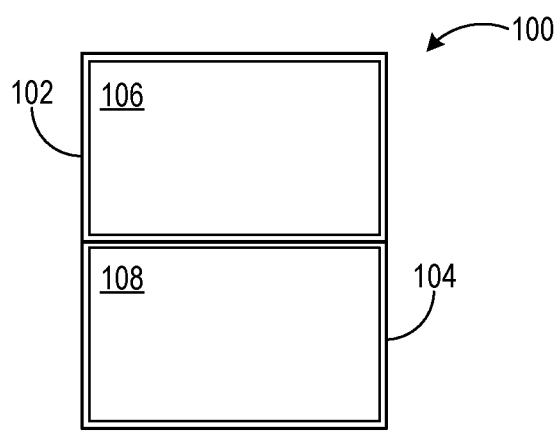

FIGS. 3A-3D show various example display orientations for computing device 100. FIG. 3A represents single portrait orientations in which only one of first and second displays 106 and 108 is active in the portrait orientation, specifically depicting first portion 102 with the first display active. Operation in this mode is referred to herein as a "portrait" mode. FIG. 3B shows a double portrait orientation in which both of first and second displays 106 and 108 are active in the portrait orientation. Operation in this mode is referred to herein as a "double portrait" mode. FIG. 3C represents single landscape orientations in which only one of first and second displays 106 and 108 is active in the landscape orientation, specifically depicting first portion 104 with the first display active. Operation in this mode is referred to herein as a "landscape" mode. FIG. 3D shows a double landscape orientation in which both of first and second displays 106 and 108 are active in the landscape orientation. Operation in this mode is referred to herein as a "double landscape" mode. Computing device 100 may detect its operation in these orientations via sensing mechanisms described below. Depending on the orientation of computing device 100, a user interface of the computing device may be configured to operate in a certain manner and/or respond to touch inputs differently.

Figure 4:
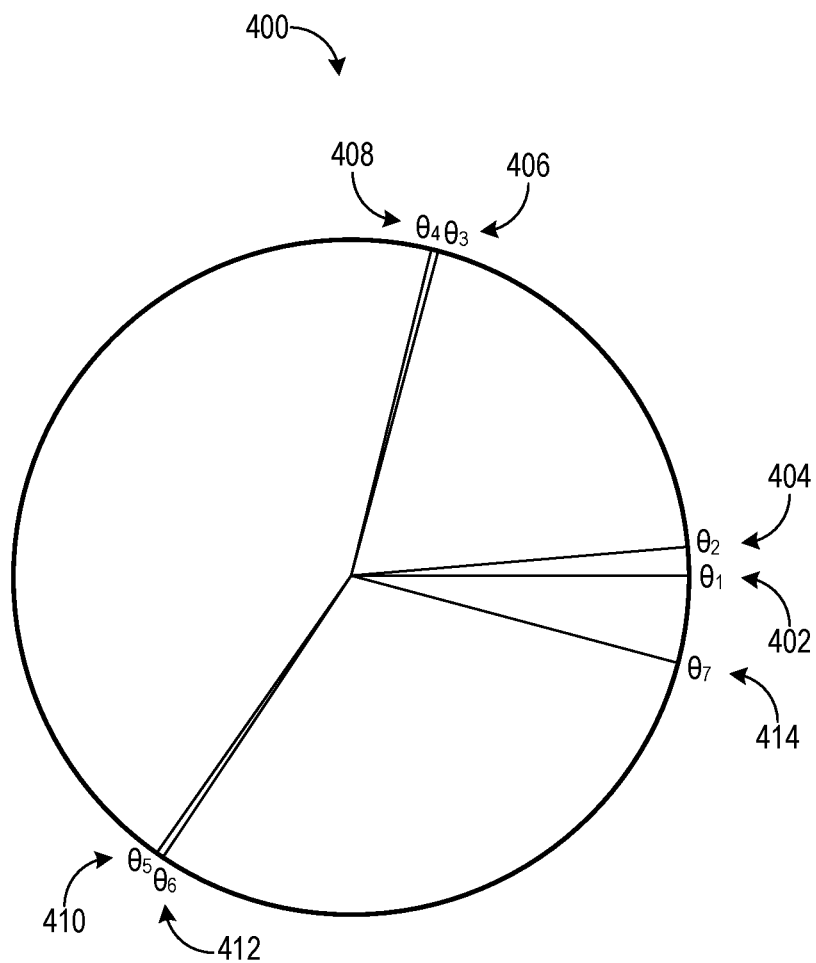
FIG. 4 shows a map illustrating an example set of angular ranges between first and second portions of the computing device of FIGS. 1A-1B.

FIG. 4 shows a map 400 illustrating an example set of angular ranges between first portion 102 and second portion 104 corresponding to different operational modes of computing device 100. Between a first angle 402 (e.g., 0°) and a second angle 404 (e.g., 5°), first and second displays 106 and 108 may be inactive, as neither display may be substantially visible in this angular range. Between the second angle 404 (e.g., 5°) and a third angle 406 (e.g., 75°), computing device 100 operates in a so-called "peek" mode of operation. As described below in greater detail, the peek mode corresponds to relative angles between first and second portions 102 and 104 where first display 106 of the first portion is substantially not visible—for example, where the first display is occluded by the housing of computing device 100, or oriented at a shallow angle relative to a user's gaze. In the peek mode, increasingly greater portions of second display 108 of second portion 104 may become visible as computing device 100 is opened. Computing device 100 thus may output a user interface at second display 108 that varies in an amount of the second display used to display content as the visible portion of the second display changes. In some examples, computing device 100 may disable second display 108 until the relative angle between first and second portions 102 and 104 is opened to the second angle $\theta_2$ 404.

Between a fourth angle 408 (e.g., 76°) and a fifth angle 410 (e.g., 235°), computing device 100 operates in a "two-display", "double", or "dual" mode of operation. As described below in greater detail, the two-display mode corresponds to relative angles between first and second portions 102 and 104 where both first and second displays 106 and 108 are substantially visible (e.g., as depicted in FIG. 1B). Thus, first and second displays 106 and 108 may be enabled in the two-display mode. Between a sixth angle 412 (e.g., 236°) and a seventh angle 414 (e.g., 345°), computing device 100 operates in a "one-display" mode of operation. As described below in greater detail, the one-display mode corresponds to relative angles between first and second portions 102 and 104 where one of first display 106 and second display 108 is not visible due to the orientations of the displays to one another. Thus, the display that is not visible may be disabled in the one-display mode. At relative angles equal to or greater than the seventh angle 414, computing device 100 is fully opened. In this posture, first and second portions 102 and 104 may be in contact with each other, or otherwise very close together. Where an incoming phone call is received at computing device 100 when the computing device 100 is not yet in this pose, opening the computing device into this pose may be configured as a trigger to answer the call. For example, where an incoming call is received with computing device 100 between the first angle 402 and the fifth angle 410, opening the computing device to the seventh angle 414 may cause the incoming call to be answered. On the other hand, in some examples, where an incoming call is received with computing device 100 at or near (e.g., +/−5°) the seventh angle 414, opening the computing device to the seventh angle or beyond the seventh angle may not cause the incoming call to be answered.

Figure 5:
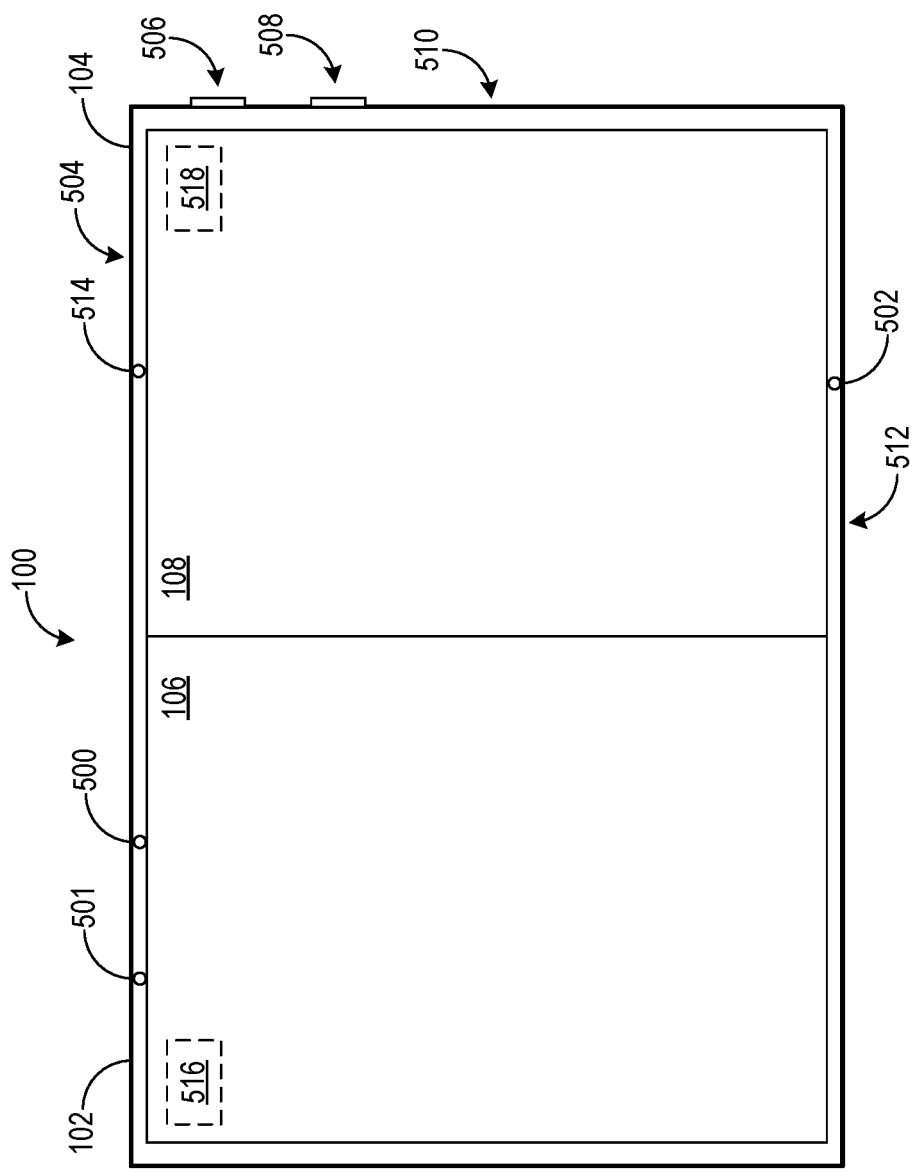
FIG. 5 schematically shows an example implementation of the computing device of FIGS. 1A-1B, and illustrates locations of various integrated devices.

FIG. 5 schematically shows an example implementation of computing device 100, and illustrates the locations of various integrated devices. In this implementation, computing device 100 includes a loudspeaker 500 (e.g. for conducting phone calls over speaker) and a microphone 501 provided in first portion 102. Computing device 100 further includes a phone receiver 502 provided in second portion 104. Receiver 502 includes a microphone configured to receive speech spoken by a user of computing device 100. Computing device 100 provides other devices at second portion 104, including a camera assembly 504 (e.g., an image sensor and/or flash emitter), a hardware control 506 selectable to change the volume of acoustic output from speaker 500, a hardware control 508 selectable to change the power state of computing device 100 (e.g., to turn the computing device on or off, to cause the computing device to enter/exit a sleep mode), and a fingerprint sensor 510 configured to capture fingerprint data for authenticating a user. Computing device 100 may control access to different features depending on whether a match between fingerprint data and a known user identity is obtained, e.g., by unlocking various features.

At second portion 104, computing device 100 also includes a port 512 (e.g., a USB-C port) operable to receive data and/or current that charges a battery of the computing device, and an earpiece 514. Earpiece 514 comprises a speaker configured to output sound audible to a user's ear when placed in contact with second portion 104 or otherwise in proximity to the second portion, and thus provides a more private call experience than loudspeaker 500. While not shown in FIG. 5, computing device 100 may include one or more touch sensors configured to sense touch inputs applied to, and/or hover inputs over, the surfaces of first and second displays 106 and 108.

Further, first portion 102 includes a first three-dimensional orientation sensor system 516 configured to provide output indicative of a three-dimensional orientation of the first portion, and second portion 104 includes a second three-dimensional orientation sensor system 518 configured to provide output indicative of a three-dimensional orientation of the second portion. In some examples, first and second orientation sensor systems 516 and 518 each include an accelerometer and a gyroscope, while in other examples one or both orientation systems further includes a magnetometer. As described in further detail below, the output produced by first and second orientation sensor systems 516 and 518 generally indicate a three-dimensional orientation of first and second portions 102 and 104, respectively. For example, first and second orientation sensor systems 516 and 518 may each indicate a respective degree of rotation about three mutually orthogonal coordinate axes, in addition to a respective degree of translation about three mutually orthogonal coordinate axes. Signals from the first and second orientation sensor systems 516 and 518 may be used to determine a hinge angle between first and second portions 102 and 104 of computing device 100. In other examples, any other suitable type of sensor may be used to determine a hinge angle, such as an optical encoder or a mechanical encoder incorporated into the hinge. Further, computing device 100 may include a sensor that senses a fully closed and/or fully open position, such as a Hall effect sensor on one portion configured to sense a magnet located on the other portion. Computing device 100 may control operation based on data from such sensors.

As described below, the functions provided by computing device 100 may differ depending on whether the computing device is operated in flip mode with first display 106 active, or in flip mode with second display 108 active. Operation in flip mode with first display 106 active is referred to as flip mode at the "speaker side", and operation in flip mode with second display 108 active is referred to as flip mode at the "receiver side", as receiver 502 is provided at second portion 104 along with the second display. A user may transition computing device 100 between flip mode at the speaker side and flip mode at the receiver side by physically rotating the computing device to change which of first and second display 106 and 108 is active. In response, certain functions and/or devices in the device portion corresponding to the active display may be enabled and/or disabled. In some examples, additional confirmation of an intent to flip operation between sides may be received before transferring operation, such as reception of a double-tap touch gesture at the side to which operation is to be transferred. In other examples, and based on certain condition(s), such additional confirmation of user intent may be foregone, as described in further detail below.

Figure 6A:
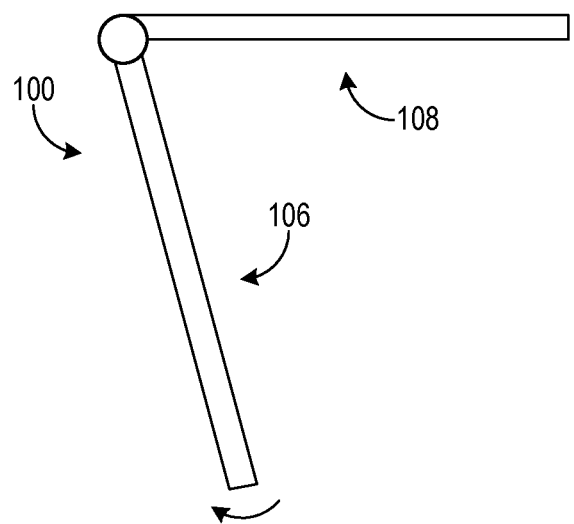
FIGS. 6A-6C show various further example poses for the computing device of FIGS. 1A-1B.
Figure 6B:
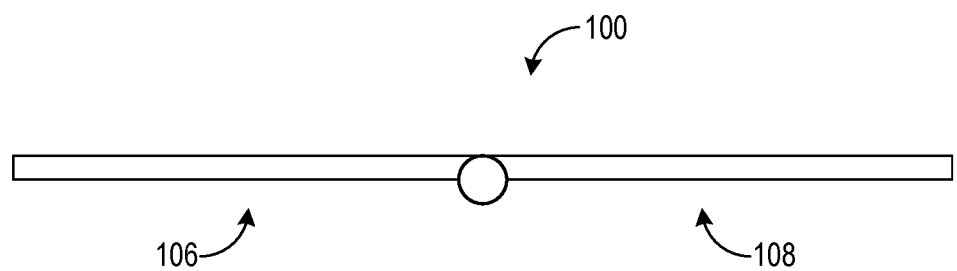
Figure 6C:
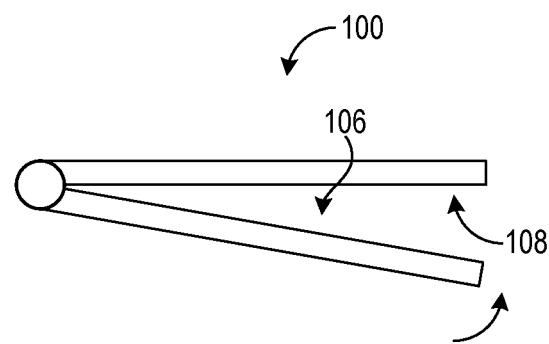

As described above, in some examples, computing device 100 may handle an incoming or ongoing phone call based upon changes in the relative angle between first display 106 and second display 108. FIGS. 6A-6C illustrate one such example in which a phone call is handled based upon this relative angle. In FIG. 6A, a notification of an incoming phone call is output via one or both of first display and second display 108. In FIG. 6B, output from a sensor system (e.g., first and second orientation sensor systems 516 and 518) of computing device 100 indicates that the relative angle between first display 106 and second display 108 has been changed to an angle greater than a first predetermined angle (e.g., by rotating the first display away from the second display). The first predetermined angle may be 75°), as one example, or any other suitable angle. In response to this change in the relative angle, computing device 100 answers the incoming phone call. Upon answering the phone call, computing device 100 may output a user interface for conducting the phone call on an active display, examples of which are described below. As also described below, in other examples computing device 100 may output, in response to the relative angle being changed to an angle greater than the first predetermined angle, a user interface with one or more controls selectable to answer or reject the incoming phone call. However, as mentioned above, where the relative angle is at or near another predetermined angle (e.g., seventh angle 414), a small change to the relative angle (e.g., +/−5°) may not cause an incoming call to be answered.

In FIG. 6C, after answering the incoming phone call, output from the sensor system of computing device 100 indicates that the relative angle between first and second displays 106 and 108 has changed to an angle less than a second predetermined angle (e.g., by rotating the first display toward the second display). In response, computing device 100 ends the ongoing phone call. The predetermined angle may be 5°, as one example, or any other suitable angle. As described below, in other scenarios computing device 100 may maintain the ongoing phone call when the relative angle falls below the second predetermined angle, such as when an audio accessory is coupled to the computing device.

Various user interfaces for performing phone-related functions on computing device 100 are described herein. At least some of the user interfaces may be part of a dialing application executed on computing device 100 for placing and/or receiving phone calls, for example. As described below, the user interfaces are displayed on one or both of first display 106 and second display 108 depending on the state of computing device 100. Various operating aspects of computing device 100 may factor into its state, including but not limited to the relative angle between first and second portions 102 and 104, which of first and second displays 106 and 108 are currently being used to interact with computing device 100, and/or whether computing device 100 is held in a portrait orientation or a landscape orientation.

FIGS. 7A-7D illustrate the reception of an incoming phone call at computing device 100 in peek mode, and subsequent handling of the call in other modes. Computing device 100 operates in peek mode based at least on a first relative angle between first display 106 and second display 108 indicated by the sensor system of the computing device satisfying an angular condition. For example, computing device 100 may operate in peek mode while the relative angle is less than a predetermined angle (e.g., 75°). As indicated at 700 in FIG. 7A, the relative angle is such that an outer edge portion 701, and not the entirety, of second display 108 is viewable when second display 108 is user-facing. Further, the relative screen angles also render first display 106 not visible. As such, second display 108 outputs a first calling UI 702 in outer edge portion 701, which in this state is the active portion of the second display in the peek mode.

First calling UI 702 may vary in size as the relative angle between first and second displays 106 and 108 changes. For example, UI 702 may expand in size as the relative angle increases and a larger area of second display 108 becomes visible, and may contract as the relative angle decreases and a smaller area of the second display becomes visible. The depicted example UI 702 indicates various aspects of computing device 100 and information relating to an incoming phone call being received by the computing device, including a status bar 704 (indicating the charge of an internal battery and the quality of wireless reception), a contact photo 706 of the caller that placed the incoming call, a name 708 of the caller, an indicator 710 indicating the location (e.g., on the lateral side of computing device 100) of fingerprint sensor 510, and a control 712 selectable to reject the incoming phone call. In other examples, a calling UI may include any other suitable information. As described below, control 712 may be selectable via a touch gesture or any other suitable input.

Figure 7A:
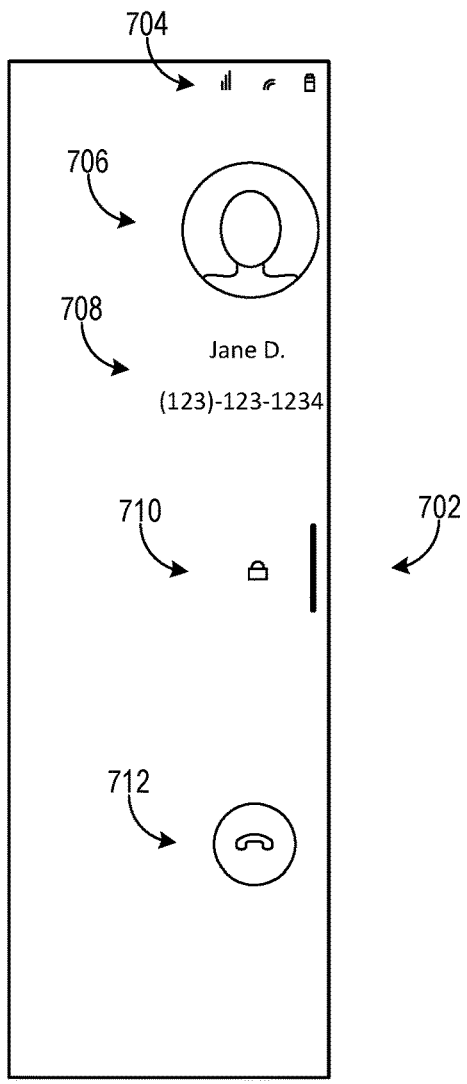
FIGS. 7A-7D illustrate reception of an incoming call at the computing device of FIGS. 1A-1B in an example peek mode and subsequent handling of the call in double display and flip modes.
Figure 7A:
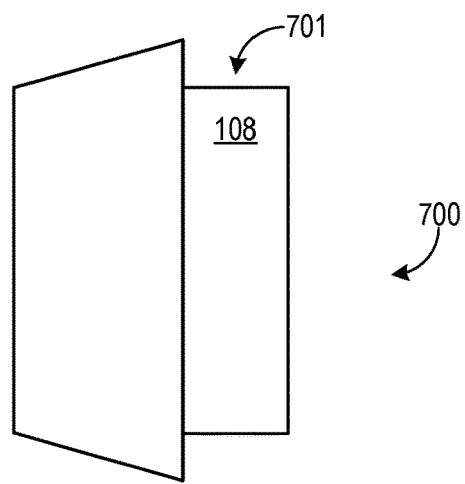
Figure 7B:
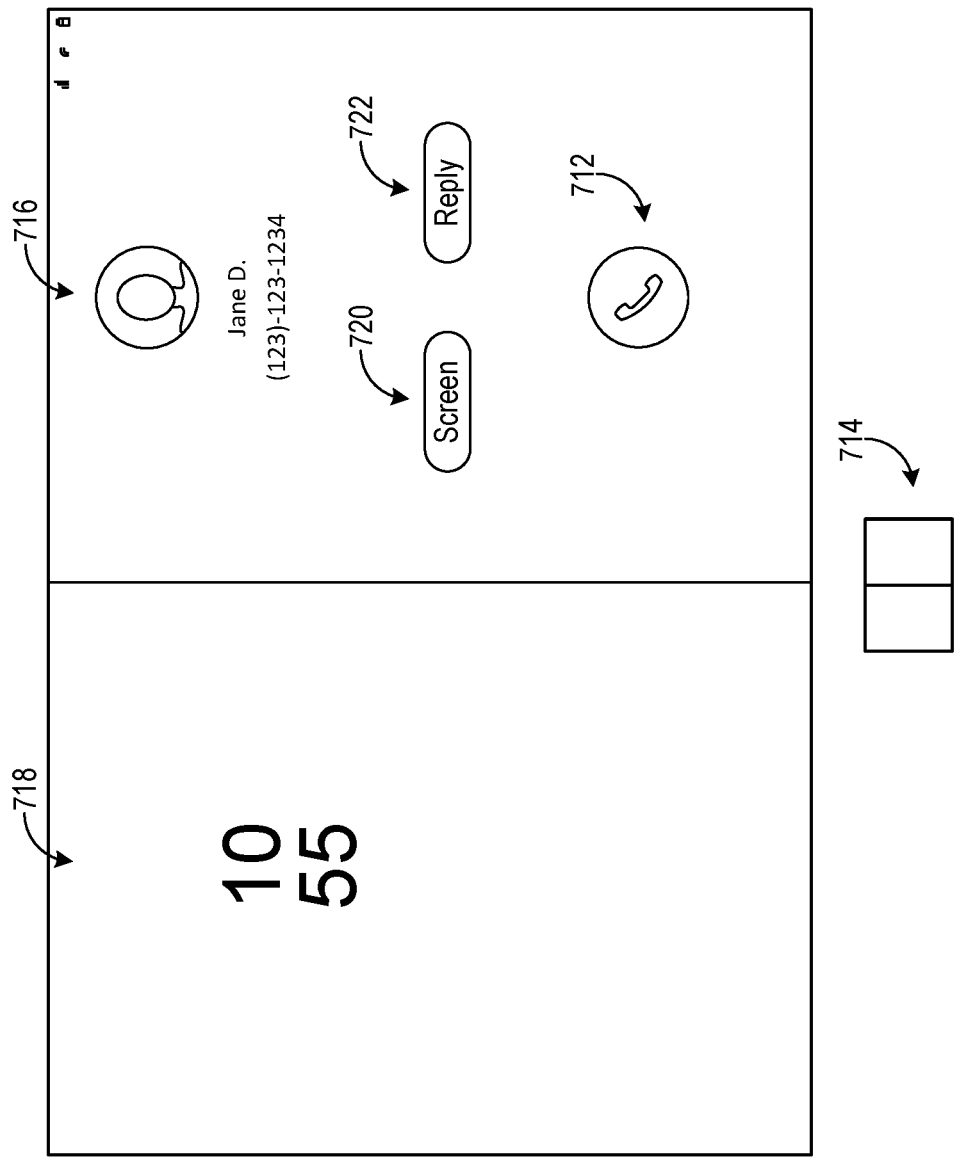
Figure 7B:
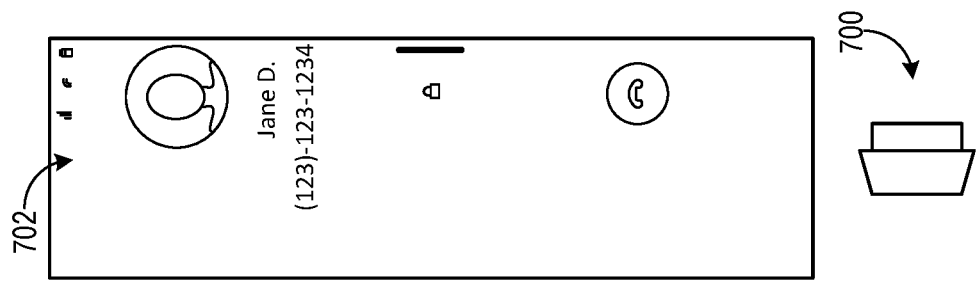

FIG. 7B illustrates how graphical output may change in response to opening computing device 100. In this example, output from the sensor system of computing device 100 indicates a second relative angle, greater than the first relative angle depicted in FIG. 7A, between first display 106 and second display 108. This second relative angle is such that both first and second displays 106 and 108 are visible when in a user-facing orientation, as indicated at 714. Based at least on the output indicating the second relative angle, computing device 100 transitions from the peek mode to a two-display mode in which both first display 106 and second display 108 are active. In the two-display mode, computing device 100 outputs a second calling UI 716 on second display 108, and outputs a time and date UI 718 on first display 106. Second calling UI 716 is different from first calling UI 702 output in peek mode. In this example, second calling UI 716 includes a control 720 selectable to screen the incoming phone call, a control 722 selectable to cause display of a menu with which a text message can be sent to the caller, and control 712 selectable to answer or reject the phone call. For example, control 712 may be selectable to reject the phone call by applying a touch input to the control and swiping down, and may be selectable to answer the phone call by applying a touch input to the control and swiping up. Control 712 may be selectable in any other suitable manner in other examples. First calling UI 702 and second calling UI 716 may differ in any suitable manner. In some examples, first calling UI 702 may include a subset of the features provided by second calling UI 716. Further, input detection (e.g., touch gesture detection) may differ between calling UIs—for example, input detection at first calling UI 702 may be adapted to the relatively smaller display space at which input can be applied compared to the available display space associated with output of second calling UI 716. Further, while second calling UI 716 is depicted in reference to operation of computing device 100 in double display mode, the second calling UI—or any other suitable calling UI described herein—may be output on one of first display 106 and second display 108 for handling an incoming call with the computing device in flip mode using the corresponding active display.

Figure 7C:
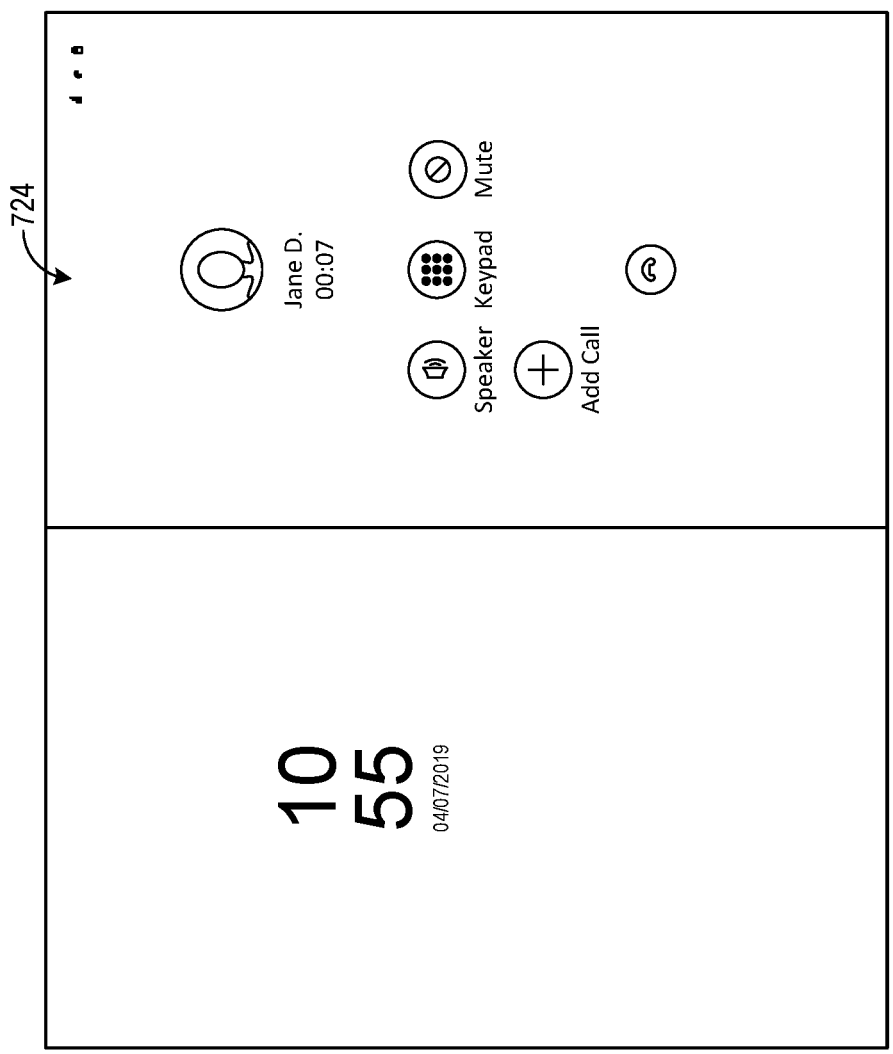
Figure 7D:
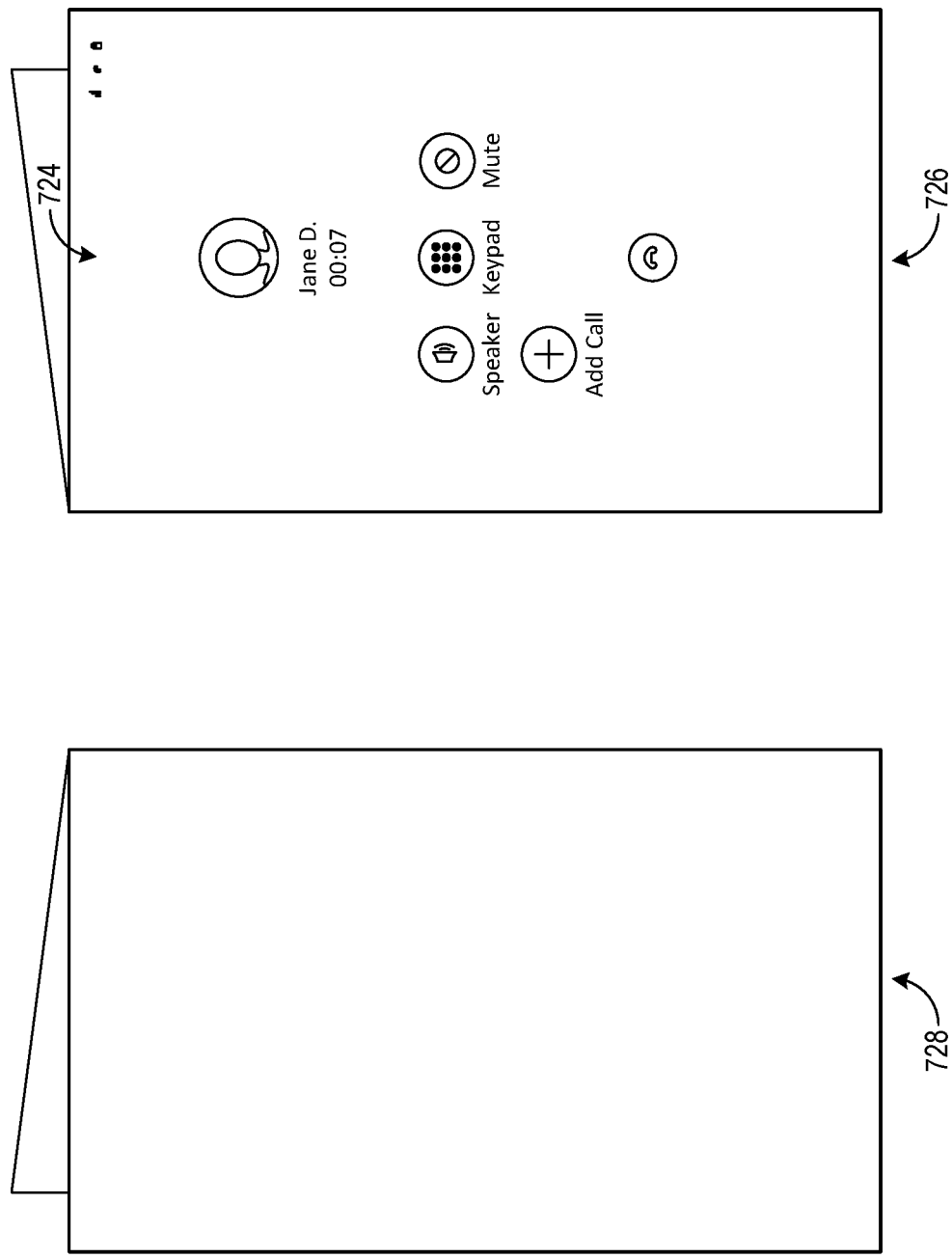

FIG. 7C illustrates the display of a calling UI 724 in response to answering the incoming call (e.g., via selection of control 712). Calling UI 724 includes various controls selectable for handling the call, examples of which are described below. In this example, computing device 100 is in a locked state in which access to feature(s) of the computing device and/or data stored thereon is restricted. Computing device 100 may be unlocked by entering a PIN or scanning a finger over fingerprint sensor 510, for example. As illustrated in FIG. 7D, in some examples in which computing device 100 is folded while locked, and is receiving an incoming call or conducting an ongoing call, second display 108—i.e., the receiver-side display—may be kept active, regardless of which device portion contributed more to the change in the relative angle between portions during folding. As indicated at 726, second display 108 is active, with calling UI 724 output thereat. As indicated at 728, first display 106 is inactive.

Figure 8:
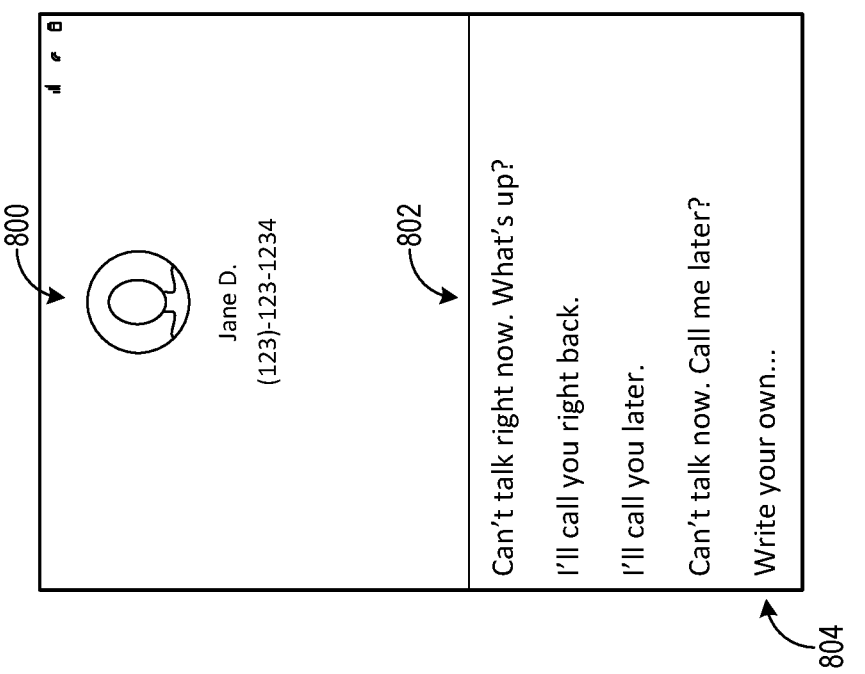
FIG. 8 illustrates the display of an example menu for responding to a caller via a predetermined text message.

FIG. 8 shows an example menu 800 that may be displayed in response to selection of control 722. Menu 800 includes various controls 802 each selectable to send, to the caller placing the incoming phone call, a corresponding predetermined text message. Menu 800 also includes a control 804 selectable to cause display of a menu with which a user of computing device 100 can write a text message. Text messages may be sent via any suitable protocol, such as short message service (SMS), for example.

Figure 9:
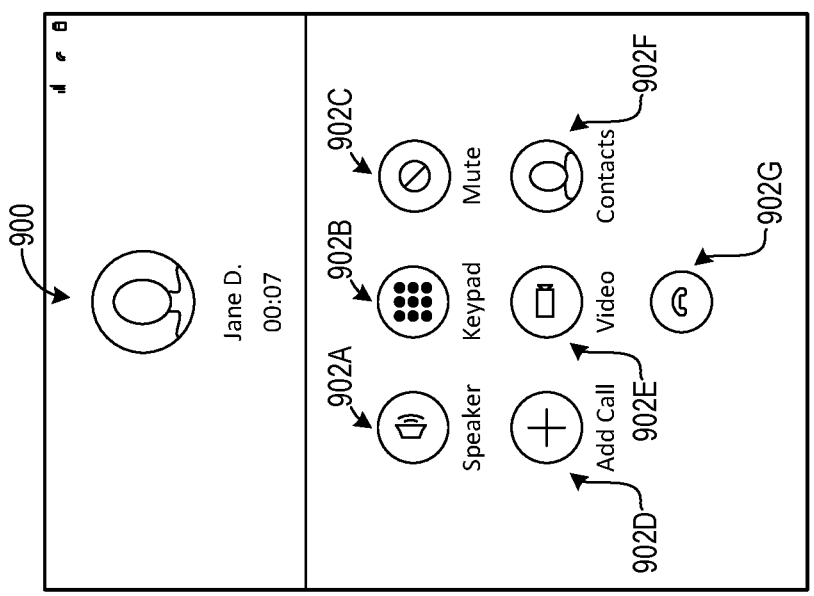
FIG. 9 illustrates the display of an example calling UI.

FIG. 9 shows an example calling UI 900 that may be displayed in response to answering the incoming phone call (e.g., via selection of control 712). UI 900 may be used for conducting the phone call via one or both of first display 106 and second display 108, and includes a set of controls 902 selectable to adjust operation of computing device 100 and adjust the state of the ongoing phone call. In this example, UI 900 includes a control 902A selectable to cause the output of call audio via loudspeaker 500, a control 902B selectable to display a menu for entering user input (e.g., ASCII input) to computing device 100, a control 902C selectable to mute the collection of audio by microphone 501 and/or receiver 502, a control 902D selectable to begin a conference call (e.g., with the current caller and additional user(s)), a control 902E selectable to request a video call with the caller, a control 902F selectable to cause display of a menu listing contacts of the user of the computing device, and a control 902G selectable to end the ongoing phone call.

Figure 10:
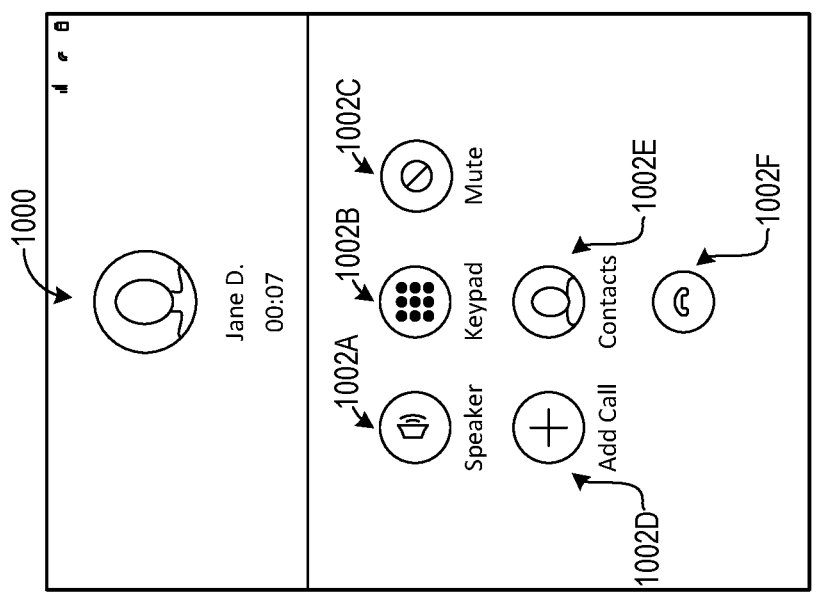
FIG. 10 illustrates the display of another example calling UI.

In some examples, computing device 100 may output a calling UI for conducting an ongoing phone call with different sets of controls based on the pose of the computing device. For example, calling UI 900 may include control 902E where second display 108 is active, corresponding to poses of computing device 100 in which second portion 104 and camera assembly 504 is user-facing, such that the user of computing device 100 is within view of the camera assembly and can be captured for the purpose of conducting a video call. In contrast, FIG. 10 shows calling UI 1000 output with a set of controls 1000 different from the set of controls 902 based on a determination that second portion 104 and camera assembly 504 is not user-facing (e.g., as computing device 100 is in flip mode with first display 106 active), and thus the user of computing device 100 cannot be captured by the camera assembly. Thus, calling UI 1000 does not include a control selectable to request a video call with the caller. Instead, controls 1000 include a control 1002A selectable to cause the output of call audio via loudspeaker 500, a control 1002B selectable to display a menu for entering user input, a control 1002C selectable to mute the collection of audio by microphone 501 and/or receiver 502, a control 1002D selectable to begin a conference, a control 1002E selectable to cause display of a menu listing contacts of the user of computing device 100, and a control 1002F selectable to end the ongoing phone call.

In some examples, an incoming call can be answered without unlocking computing device 100. A user also may choose to unlock computing device 100 to answer the call, or after answering the call, such as by scanning a finger via fingerprint sensor 510, entering a PIN on a code entry UI, or via any other suitable mechanism. Further, in some examples where first display 106 and second display 108 are both active, a calling UI for conducting a phone call may be displayed on either display. In other examples where first display 106 and second display 108 are both active, a calling UI for conducting a phone call may be persistently displayed on the second display without being displayed on the first display. This may help lead a user to conduct the call at the receiver-side portion of computing device 100 at which receiver 502 is provided. At the display at which the calling UI is not provided, computing device 100 may output another UI or screen whose contents may vary depending on whether the computing device is in the locked or unlocked state. For example, where computing device 100 is locked, the other UI may display a time and/or date, and potentially may include a control selectable to control a function of camera assembly 504. Where computing device 100 is unlocked, the other UI may additionally include controls each selectable to launch a corresponding application, for example.

Figure 11A:
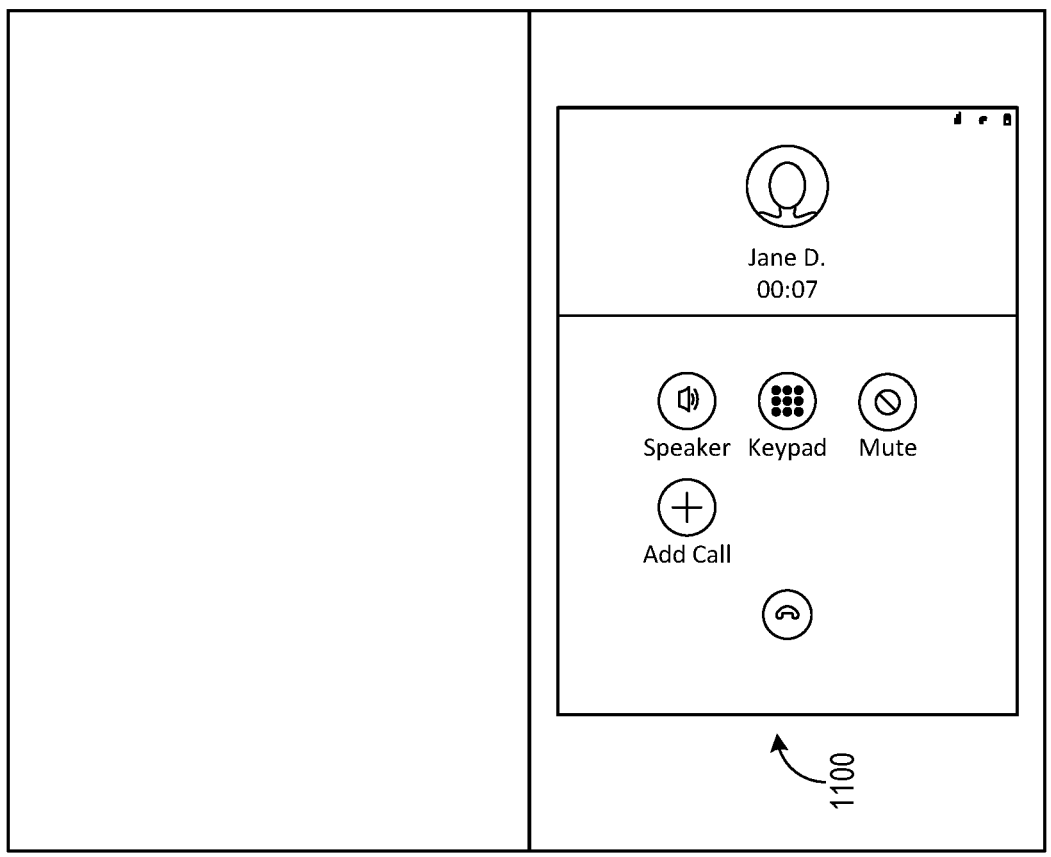
FIGS. 11A-11B illustrate the display of another example calling UI in a portrait orientation while the computing device of FIGS. 1A-1B is in a portrait orientation and a landscape orientation, respectively.
Figure 11B:
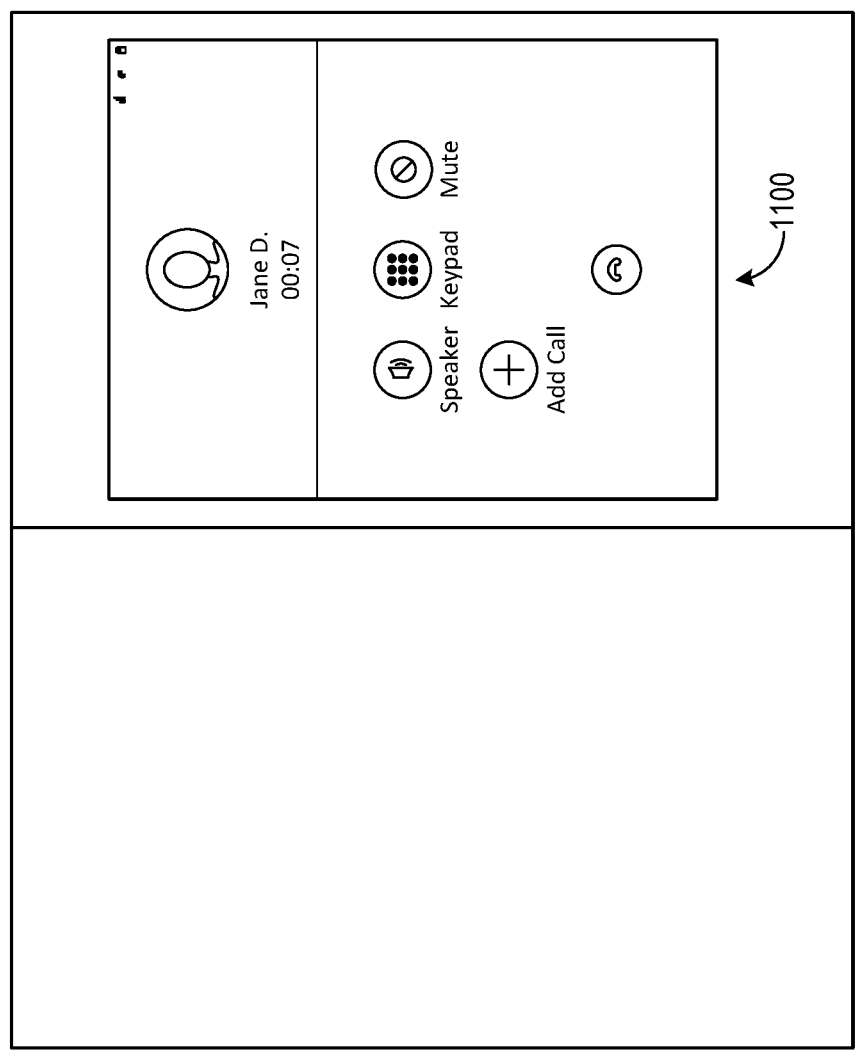

In some examples, a UI may be displayed in a portrait orientation while computing device 100 is positioned in a landscape orientation. FIGS. 11A-11B illustrate one such example in which, as shown in FIG. 11A, a calling UI 1100 (e.g., calling UI 1000) is displayed in the portrait orientation while computing device 100 is in the landscape orientation. In FIG. 11B, computing device 100 is rotated to the portrait orientation. In this state, the orientation of computing device 100 is congruent with the orientation of calling UI 1100. The persistent display of calling UIs in the portrait orientation, regardless of the orientation of computing device 100, may leverage a user tendency to rotate the computing device so that the calling UIs appear in portrait mode from their perspective, which may unobtrusively guide users to hold the computing device in a position to conduct phone calls using receiver 502 and earpiece 514.

Figure 12A:
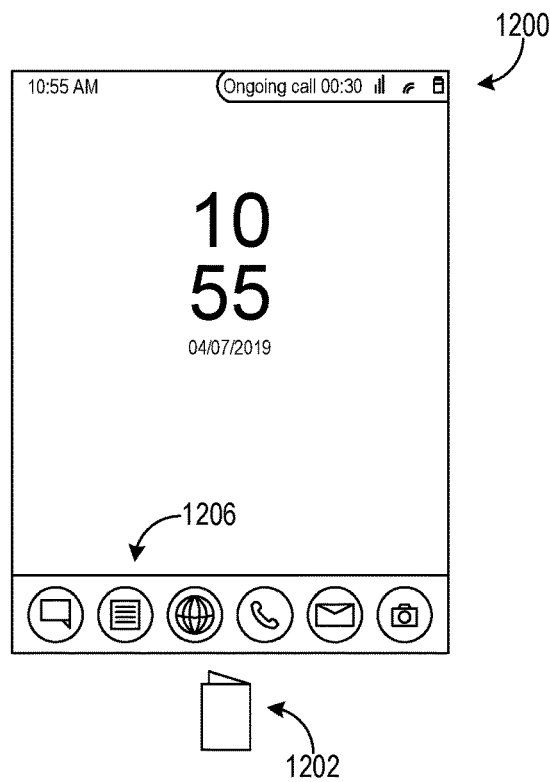
FIGS. 12A-12C illustrate the display of a call status bar displayed during an ongoing call with the computing device of FIGS. 1A-1B in flip mode at a speaker side and at a receiver side of the computing device.
Figure 12B:
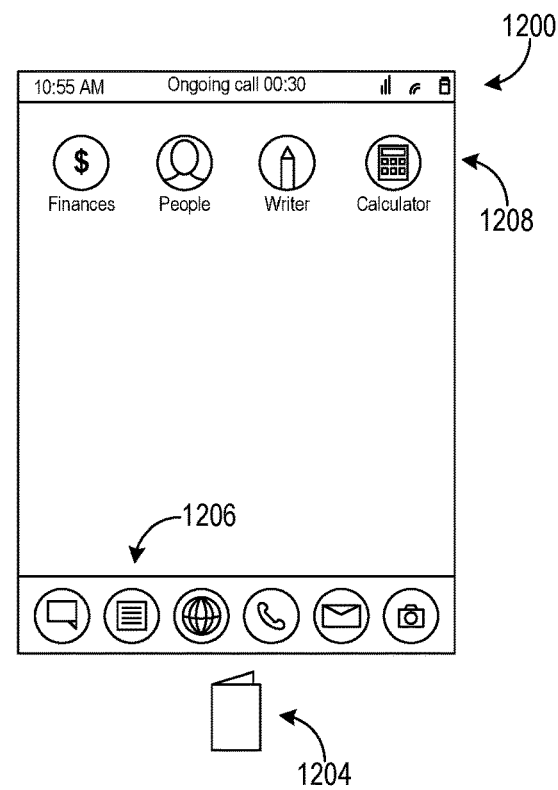

Computing device 100 may output via one of first display 106 and second display 108 a call status bar indicating an ongoing status of a phone call. In some examples, the appearance of the call status bar may be varied depending upon to which display the call status bar is output—e.g., to indicate the location of receiver 502. FIGS. 12A-12B illustrate such an approach in which computing device 100 operates in flip mode. In FIG. 12A, a call status bar 1200 is displayed on first display 106, which as indicated at 1202 is the active display. At first display 106, call status bar 1200 extends along a portion, and not the entirety, of the width of the first display. This extension along the portion of the width of first display 106 may indicate that the first display is not the receiver side of computing device 100. In FIG. 12B, call status bar 1200 is displayed on second display 108, which as indicated at 1204 is the active display. At second display 108, call status bar 1200 extends along a substantial entirety of the width of the second display. This extension along the substantial entirety of the width of second display 108 may indicate that the second display is the receiver side of computing device 100. In both cases, computing device 100 is unlocked, with a pinned apps bar 1206 output on both first and second displays 106 and 108.

Figure 12C:
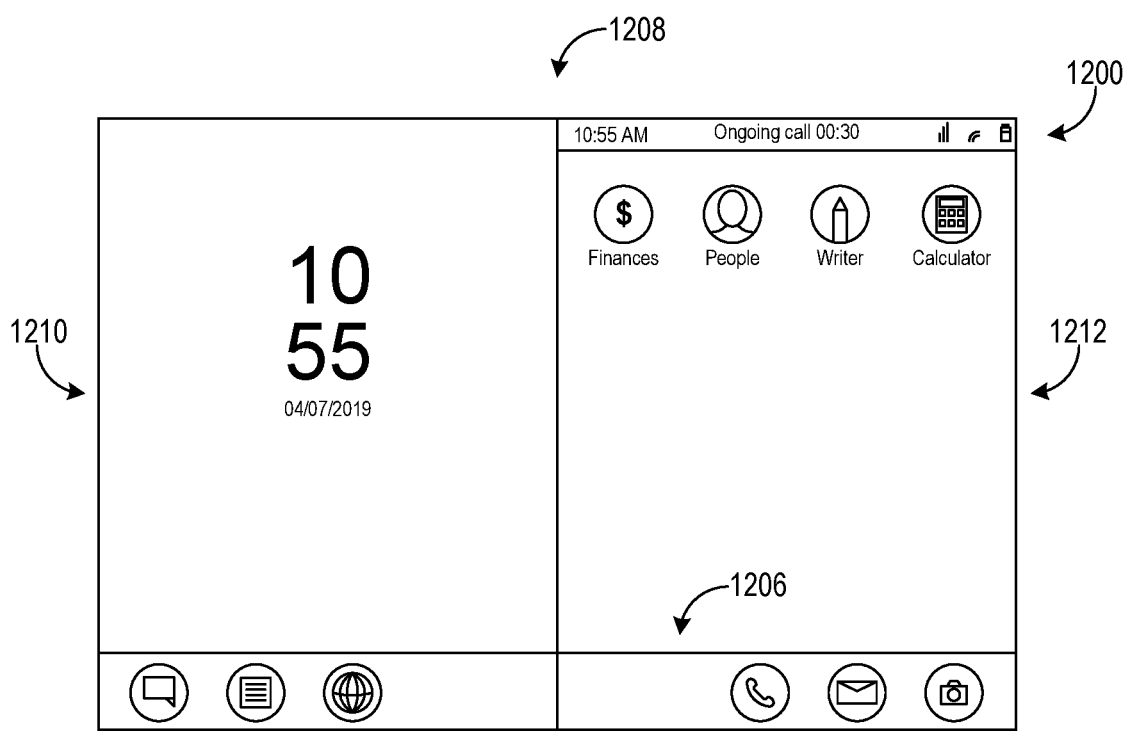

FIG. 12C illustrates the output of call status bar 1200 at second display 108 with computing device 100 in double display mode (i.e., with both displays active). In this example, call status bar 1200 is displayed as extending along the substantial entirety of the width of second display 108. Call status bar 1200 may be selectable (e.g., via touch input) to cause display of a calling UI (e.g., UI 1000) for conducting the ongoing call. Further, a home UI 1208 is provided across both displays, with a first page 1210 of the home UI output on first display 106 and a second page 1212 of the home UI output on second display 108. When computing device 100 is in flip mode, a user may navigate between first and second pages 1210 and 1212—i.e., alter which page is shown on the active display. A horizontal swipe gesture may cause page navigation, for example. Further, each page of home UI 1208 may be user customizable, such that the graphical content of one page output on one display can be output on the other display.

Call status bar 1200 may be displayed based on a previously displayed calling UI (e.g., calling UI 900). For example, call status bar 1200 may be displayed at the display where a calling UI was previously displayed in response to hiding the calling UI. The calling UI may be hidden by applying a touch input to the calling UI and swiping up, for example, or via any other suitable mechanism. With computing device 100 in double display mode, in some examples call status bar 1200 may be persistently displayed on second display 108, if a calling UI is not in the foreground, regardless of which display the calling UI was previously displayed on. Upon returning the calling UI to the foreground (e.g., by tapping a highlighted area of call status bar 1200), the calling UI may be persistently displayed on second display 108.

As mentioned above, the functions provided by computing device 100 may differ depending on which of first display 106 or second display 108 is used to as conduct a phone call. In some examples, receiver 502 may be disabled when conducting a phone call using first display 106 as the active display. As such, computing device 100 may output a notification at first display 106 indicating the unavailability of receiver 502 when conducting the phone call using first display 106. Alternatively or additionally, when conducting a phone call using first display 106 as the active display, earpiece 514 may be muted while microphone 501 is active. Still further, in some examples receiver 502 may be active during ongoing calls for all poses of computing device 100.

Figure 13A:
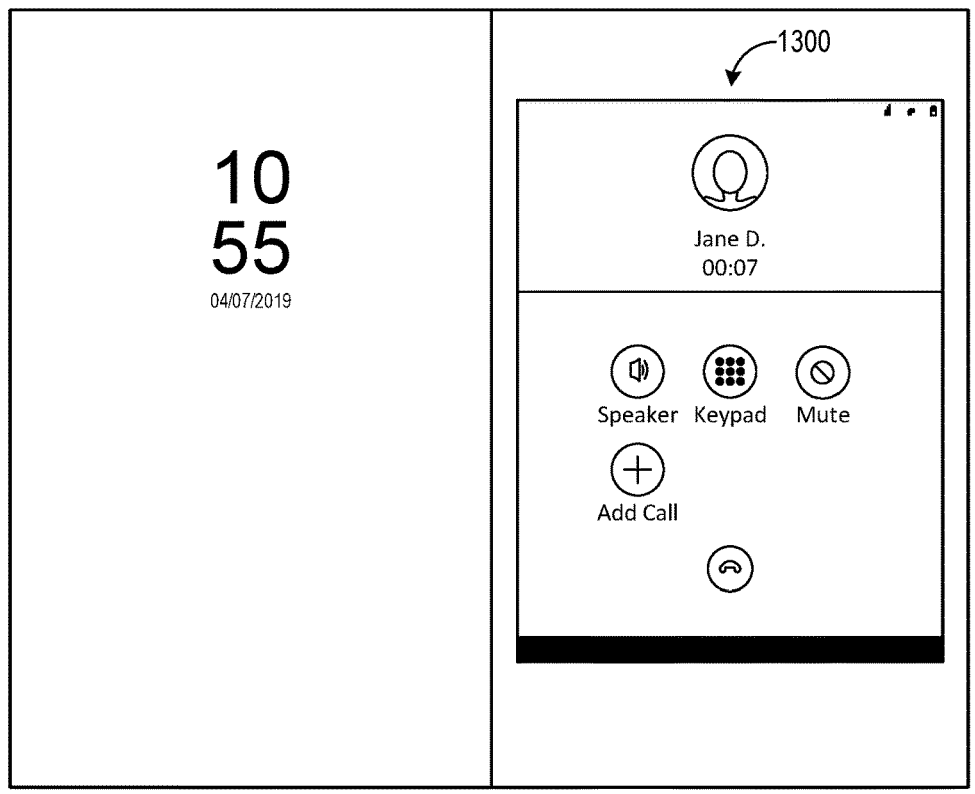
FIGS. 13A-13C illustrate the display of an example calling UI transferred between displays of the computing device of FIGS. 1A-1B during a phone call.
Figure 13B:
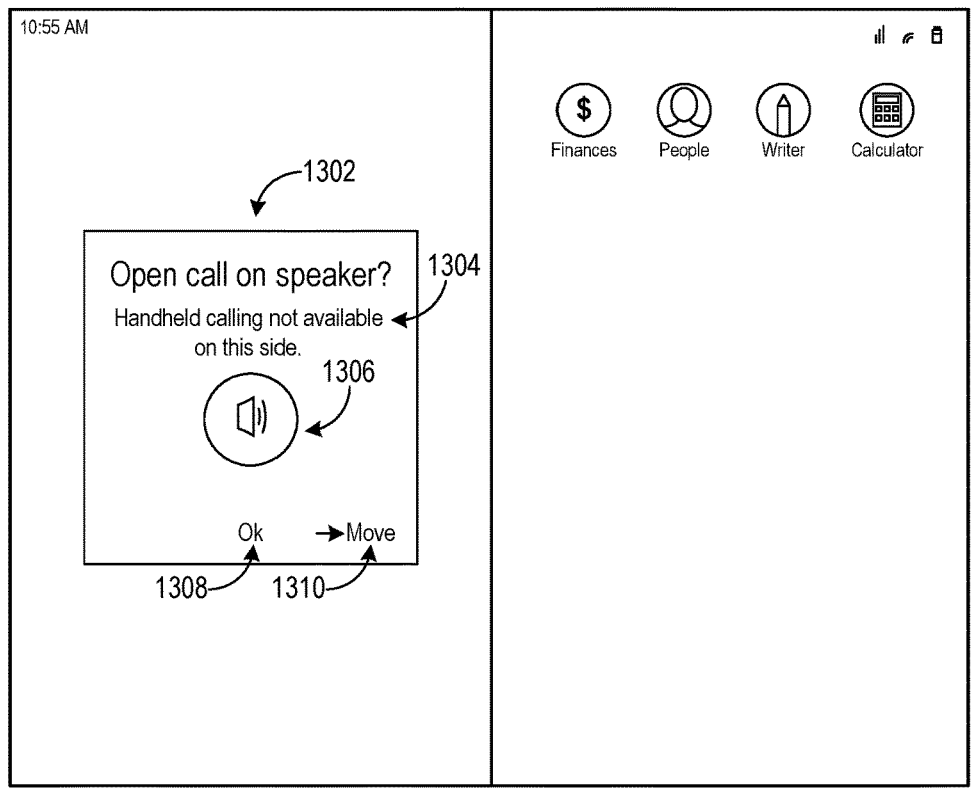
Figure 13C:
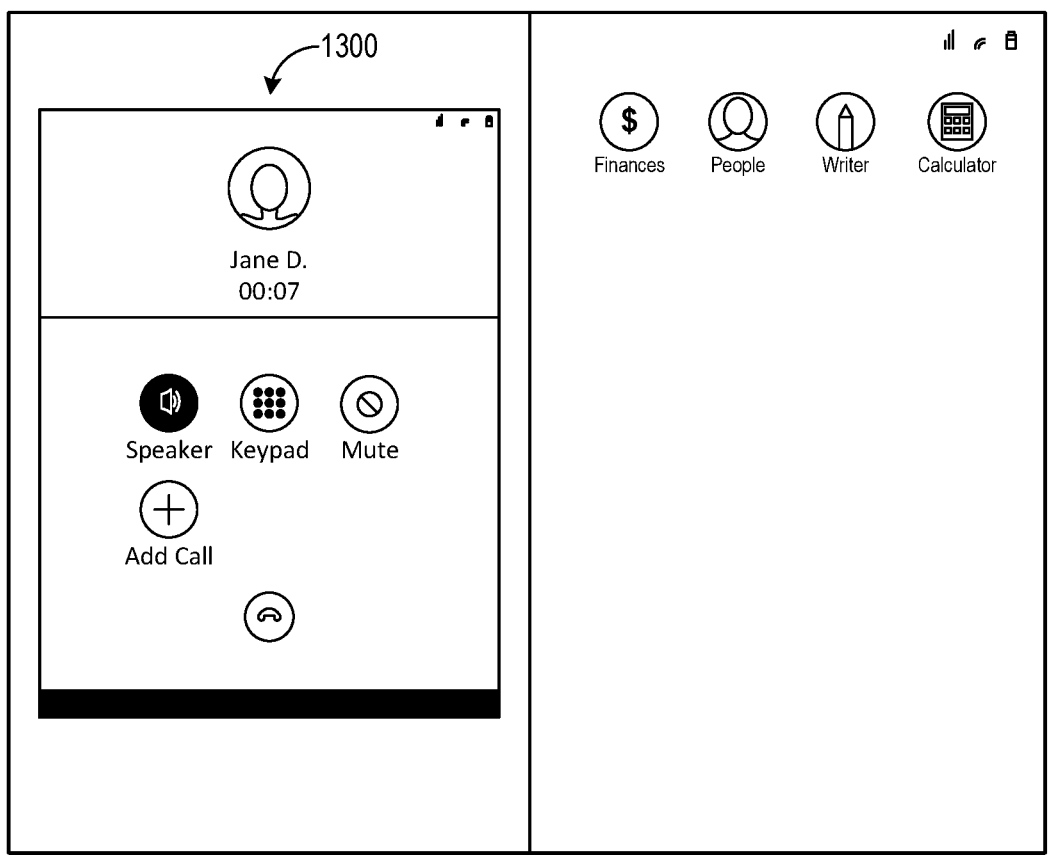

FIGS. 13A-13B illustrate an example in which a calling UI is transferred between displays with computing device 100 operated in double portrait mode. In FIG. 13A, a calling UI 1300 is output on second display 108 for handling an ongoing phone call. In FIG. 13B, calling UI 1300 is transferred from second display 108 to first display 106 in response to receiving a user input, such as a touch input applied to the calling UI 1300 and dragged from the second display to the first display. In response, first display 106 outputs a notification 1302 indicating, via a caption 1304, that receiver 502 is unavailable when conducting the phone call using the first display as an active display, and that loudspeaker 500 is available when conducing the phone call using the first display. Notification 1302 includes a control 1306 selectable to conduct the call using loudspeaker 500. In some examples, where an audio accessory (e.g., a Bluetooth headset) is coupled to computing device 100, control 1306 alternatively or additionally may be selectable to conduct the call using the audio accessory. Further, notification 1302 includes a control 1308 selectable to dismiss the notification (and conduct the call using first display 106), and a control 1310 selectable (e.g., via touch input) to transfer calling UI 1300 from the first display to second display 108. Thus, computing device 100 may transfer calling UI 1300 from first display 106 to second display 108 in response to receiving a touch input applied to control 1310. Upon receiving user input opting to conduct the call using first display 106, calling UI 1300 may be displayed in response, with a control 1312 being highlighted to indicate use of loudspeaker 500, as shown in FIG. 13C.

Figure 14:
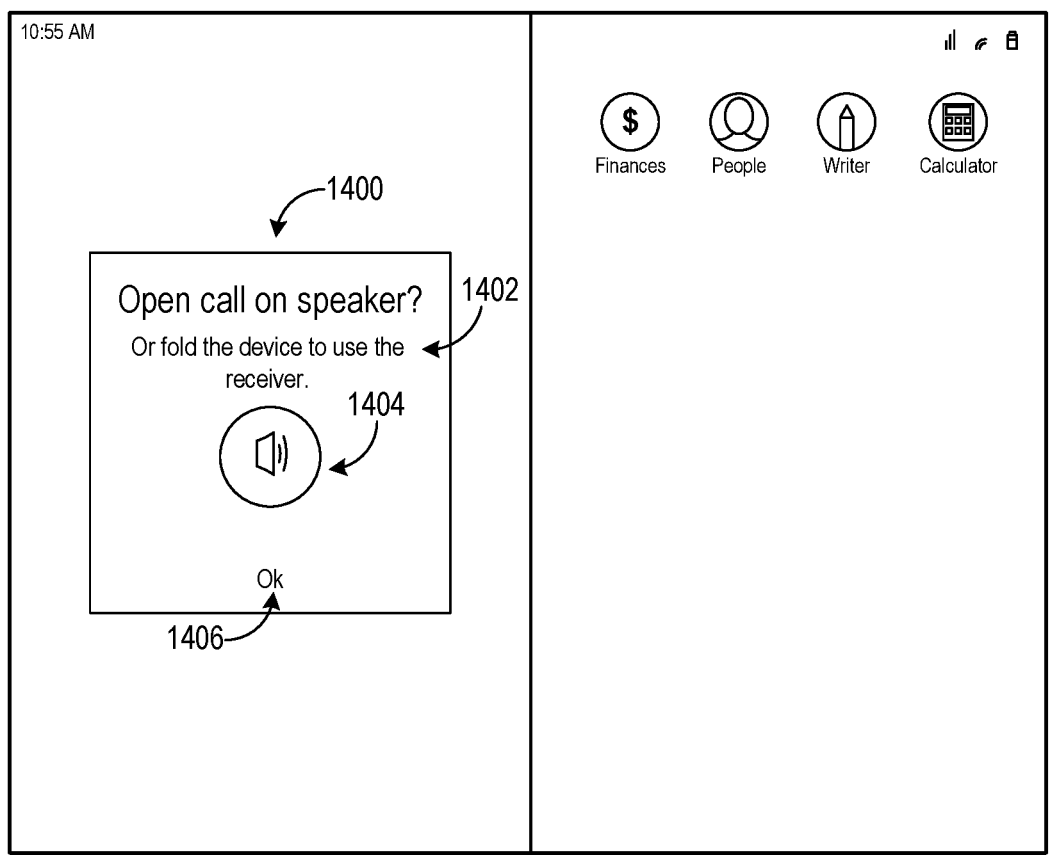
FIG. 14 illustrates the display of an example notification providing options with regard to answering a call when in a double display mode.

FIG. 14 shows a notification 1400 output at first display 106 indicating, via a caption 1402, that a phone call can be conducted with the first display using loudspeaker 500 or by folding computing device 100 to place the computing device in flip mode with second display 108 active, thereby enabling use of receiver 502. Thus, computing device 100 may transfer a calling UI displayed on first display 106 to second display 108 in response to detecting a change in a relative angle between the first display and the second display. Notification 1400 includes a control 1402 selectable to conduct the call via loudspeaker 500, and a control 1404 selectable to dismiss the notification.

Figure 15:
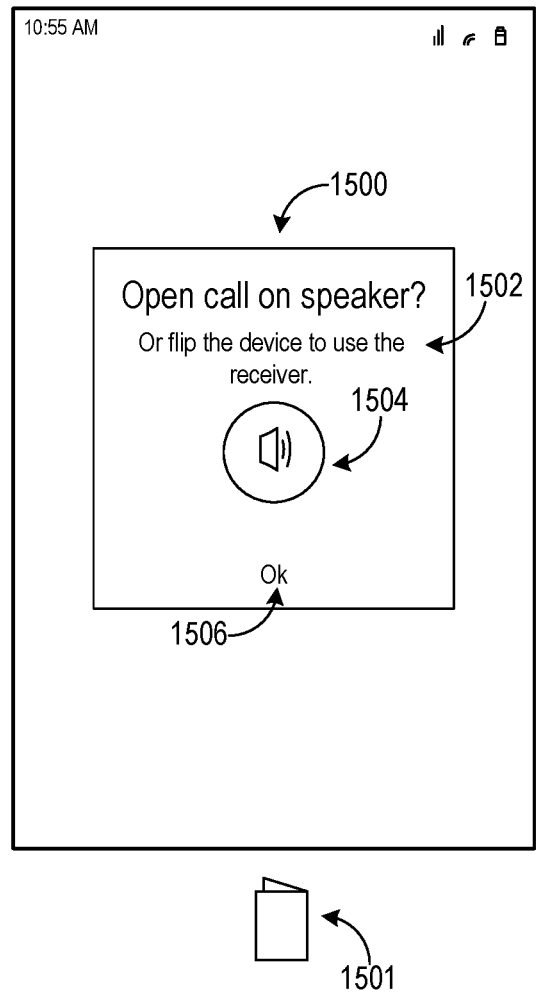
FIG. 15 illustrates the display of an example notification providing options with regard to answering a call when in flip mode and at a non-receiver side of the device.

FIG. 15 shows a notification 1500 output at first display 106 with computing device 100 in flip mode, as indicated at 1501. Notification 1500 indicates, via a caption 1502, that a phone call can be conducted using loudspeaker 500, or by flipping computing device 100 to thereby change the orientation of the computing and render second display 108 active for conducting the call. Thus, computing device 100 may transfer a calling UI displayed on first display 106 to second display 108 in response to detecting a change in the orientation of the computing device corresponding to the computing device being flipped. Computing device 100 may transfer the calling UI for an ongoing, answered call. Alternatively, where the call is an incoming, unanswered call, control 1504 may be selected to answer the call using first display 106, prompting output of a calling UI at the first display. Further, caption 1502 may alternatively or additionally explicitly indicate that handheld calling is not available when conducting calls using first display 106 (e.g., via the text "Handheld calling not available on this side."). In some examples, computing device 100 may activate loudspeaker 500 (and not earpiece 514) in response to answering an incoming call in flip mode at the speaker side. An indication that this action will be performed may be output via a caption above control 1504 or another control selectable to answer the incoming call, for example.

Figure 16:
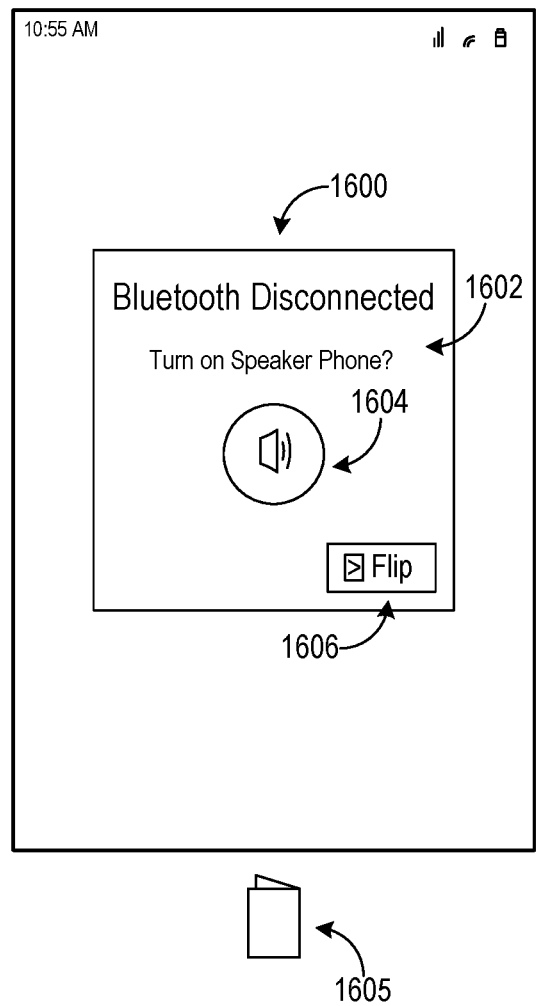
FIG. 16 illustrates the display of an example notification regarding answering a call in flip mode at a non-receiver side of the device.

As noted above, in some examples calls may be conducted using an audio accessory such as a Bluetooth headset coupled to computing device 100. In such examples, a notification may be output upon disconnection of the audio accessory (e.g., during an ongoing call). As one example, FIG. 16 shows a notification 1600 indicating, via a caption 1602, that an audio accessory has been disconnected from computing device 100, and also prompting a user to activate loudspeaker 500 (via selection of a control 1604) to conduct the call. In this example, computing device 100 is in flip mode with first display 106 active, as indicated at 1605. Notification 1600 also indicates, via an icon 1606, that computing device 100 may be flipped to conduct the call using second display 108.

Depending on the context of a call, one or more of the notifications described herein may be displayed upon receiving an incoming, unanswered call, and/or during an ongoing, answered call. In some examples, computing device 100 may output by default notifications of an incoming call, and calling UIs for conducting calls, at second display 108. Calling UIs may then be transferred from second display 108 to first display 106, and from the first display to the second display, via the mechanisms described herein.

Figure 17:
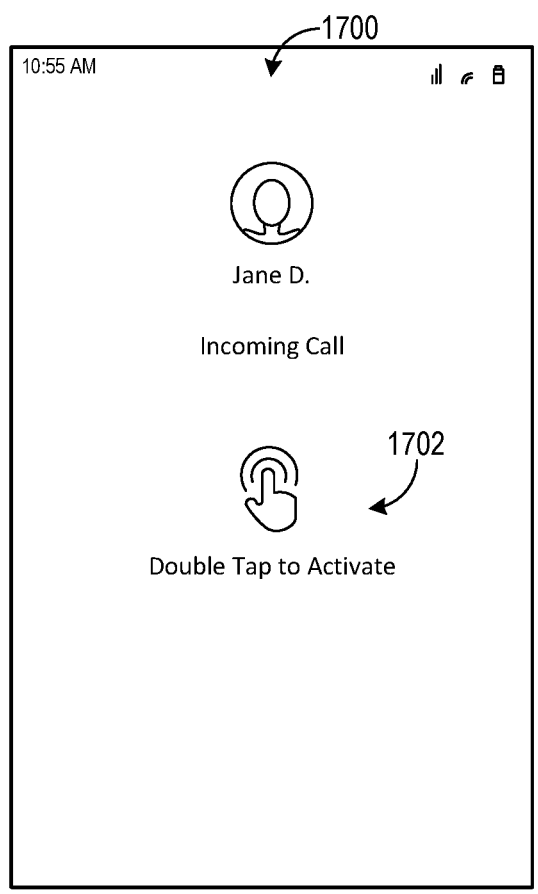
FIG. 17 illustrates the display of an example confirmation UI regarding a user intent to transfer a phone call between displays of the computing device of FIGS. 1A-1B.

In some examples, a calling UI may be transferred between displays in response to a user input confirming an intent to transfer the calling UI. FIG. 17 shows a confirmation UI 1700 output on the active display with computing device 100 in flip mode, prompting, via a caption 1702, a user to confirm the transfer of a calling UI to this active display via a double tap touch gesture. Upon receiving this user input, the calling UI may be displayed on the active display. Confirmation UI 1700 may be displayed in any suitable scenario, for example in response to transferring the calling UI between displays by selection of a control or flipping computing device 100. As a specific example, confirmation UI 1700 may be displayed in response to flipping computing device 100 after a notification (e.g., notification 1500) is dismissed. Confirmation UI 1700 may also be output on the display to which the calling UI is to be transferred with computing device 100 in dual mode (e.g., in response to dragging the calling UI between displays), and/or in response to folding the computing device. Further, confirmation UI 1700 may be used to seek confirmation of user intents other than transferring a calling UI (e.g., answering an incoming call). In some examples, however, a calling UI may be transferred between displays (e.g., in response to flipping computing device 100) without display of confirmation UI 1700.

Figure 18:
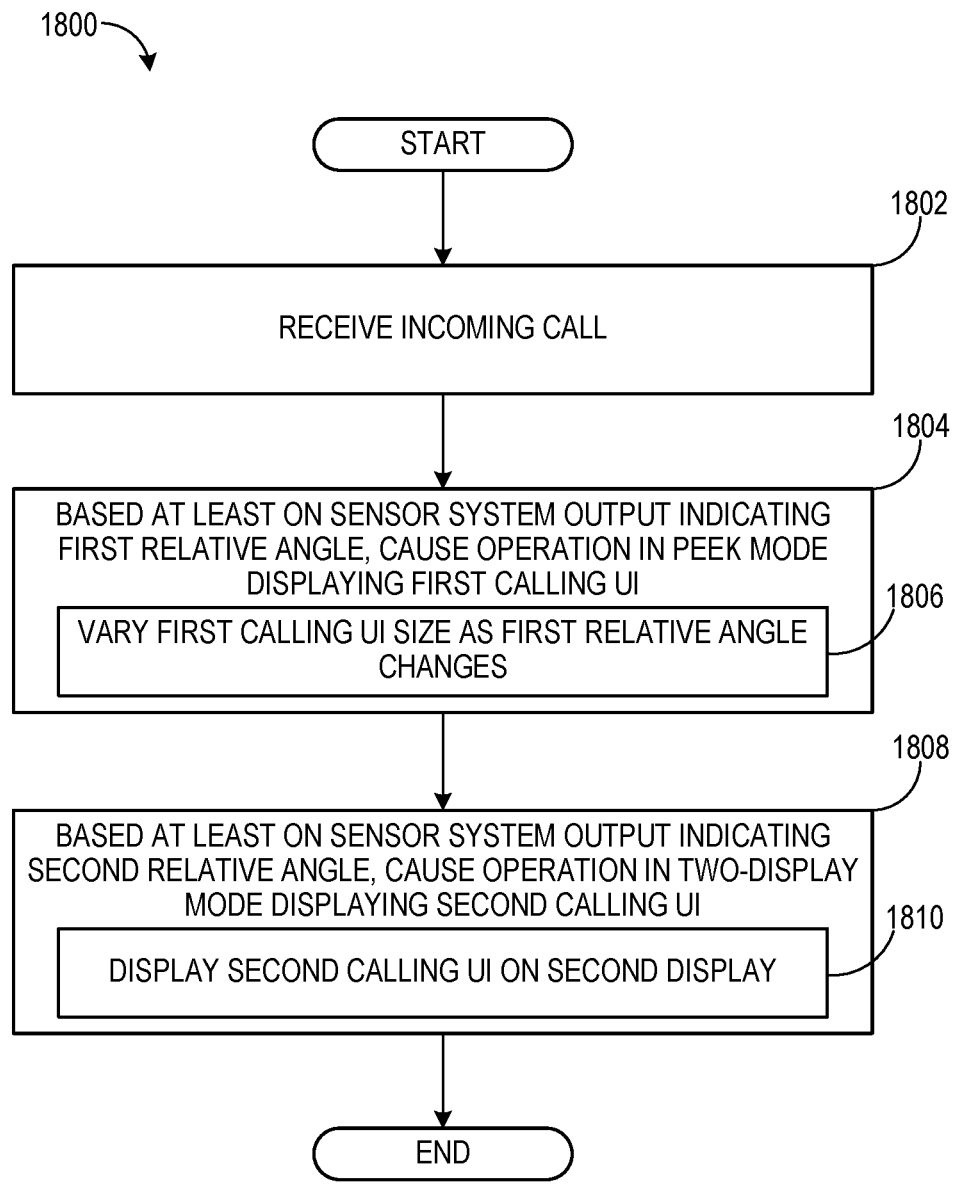
FIG. 18 shows a flowchart illustrating a method of displaying a calling UI at a computing device.

FIG. 18 shows a flowchart illustrating a method 1800 of displaying a calling UI at a computing device. Method 1800 may be implemented on computing device 100, for example.

At 1802, method 1000 includes receiving an incoming phone call. At 1804, method 1000 includes, based at least on output from a sensor system of the computing device indicating a first relative angle between a first display of the computing device and a second display of the computing device, causing operation of the computing device in a peek mode in which an outer edge portion of one of the first display and the second display is active. The peek mode displays a first calling UI at the active display. Causing operation in the peek mode may include varying 1806 the first calling UI as the first relative angle changes.

At 1808, method 1000 includes, based at least on output from the sensor system indicating a second relative angle between the first display and the second display, causing operation of the computing device in a two-display mode in which both of the first display and the second display are active, the second relative angle being greater than the first relative angle, and the two-display mode displaying a second calling UI that is different than the first calling UI. Displaying the second calling UI may include displaying 1810 the second calling UI on the second display.

Figure 19:
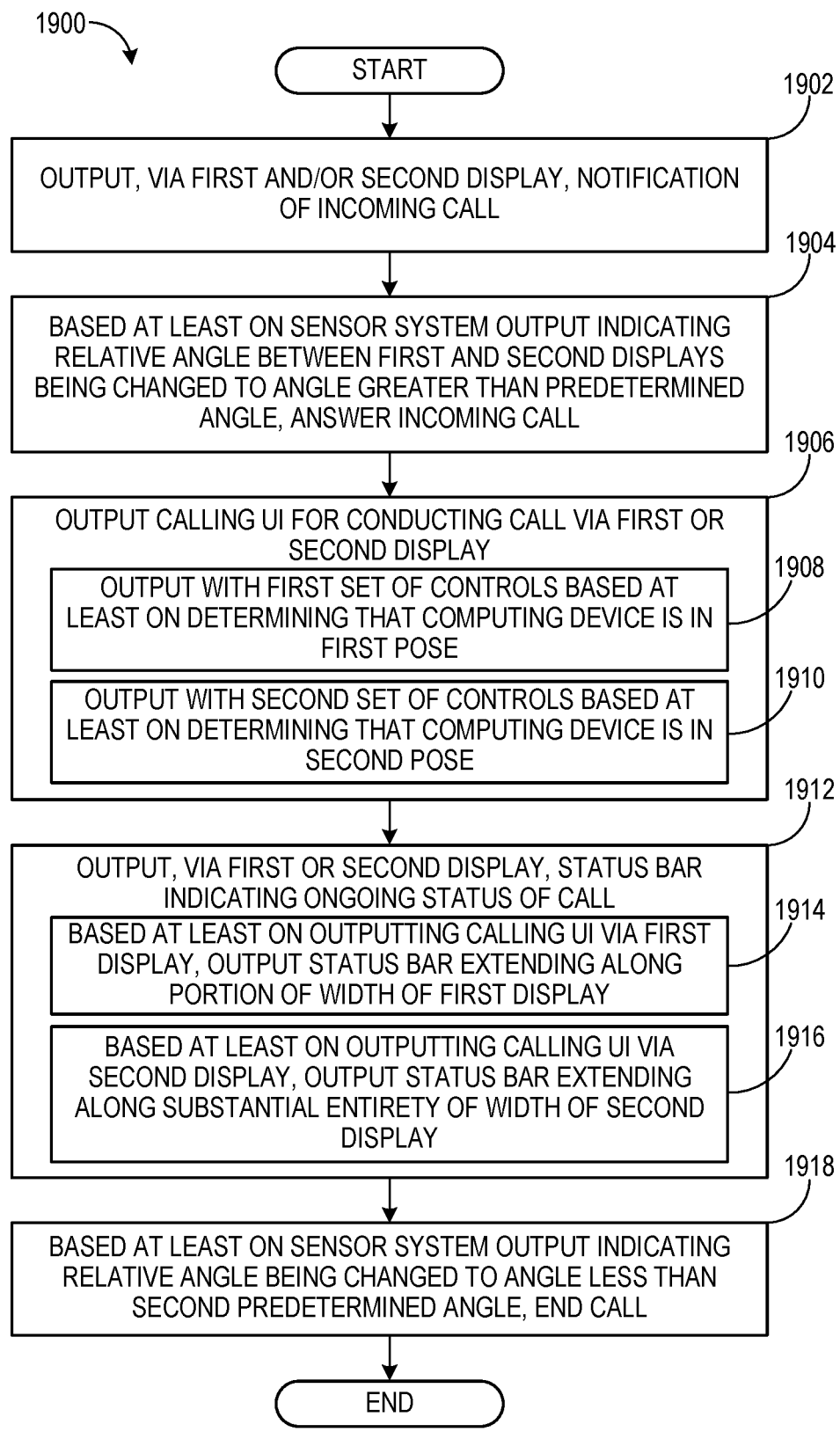
FIG. 19 shows a flowchart illustrating a method of answering an incoming phone call at a computing device.

FIG. 19 shows a flowchart illustrating a method 1900 of answering an incoming phone call at a computing device. Method 1900 may be implemented on computing device 100, for example.

At 1902, method 1900 includes outputting, via one or both of a first display of the computing device and a second display of the computing device, a notification of an incoming phone call at the computing device. At 1904, method 1900 includes, based at least on output from a sensor system of the computing device indicating a relative angle between the first display and the second display being changed to an angle greater than a predetermined angle, answering the incoming phone call.

At 1906, method 1900 includes, in response to and after answering the incoming phone call, outputting a calling UI for conducting the phone call via one of the first display and the second display. Outputting the calling UI may include outputting 1908 the calling UI with a first set of controls based at least on determining that the computing device is in a first pose. Outputting the calling UI may include outputting 1910 the calling UI with a second set of controls different from the first set of controls based at least on determining that the computing device is in a second pose. For example, the first set of controls may include a control selectable to request a video call where it is determined that computing device 100 is in a pose with second portion 104 being user-facing, and the second set of controls may omit the control selectable to request a video call where it is determined that the computing device is in a pose with the second portion not being user-facing.

At 1912, method 1900 includes outputting, via one of the first display and the second display, a call status bar indicating an ongoing status of the phone call. Outputting the call status bar may include, based at least on outputting a calling UI via the first display, outputting 1914 the call status bar extending along a portion of a width of the first display. Outputting the call status bar further may include, based at least on outputting the calling UI via the second display, outputting 1916 the call status bar extending along a substantial entirety of the width of the second display.

At 1918, method 1900 includes, based at least on output from the sensor system indicating the relative angle being changed to an angle less than a second predetermined angle, ending the phone call. The predetermined angle assessed at 1904 may be a first predetermined angle different from the second predetermined angle, for example.

In some examples, method 1900 may include, based at least on output from the sensor system indicating the relative angle being changed to an angle less than the second predetermined angle, and an audio accessory being coupled to the computing device, maintaining the phone call.

Figure 20:
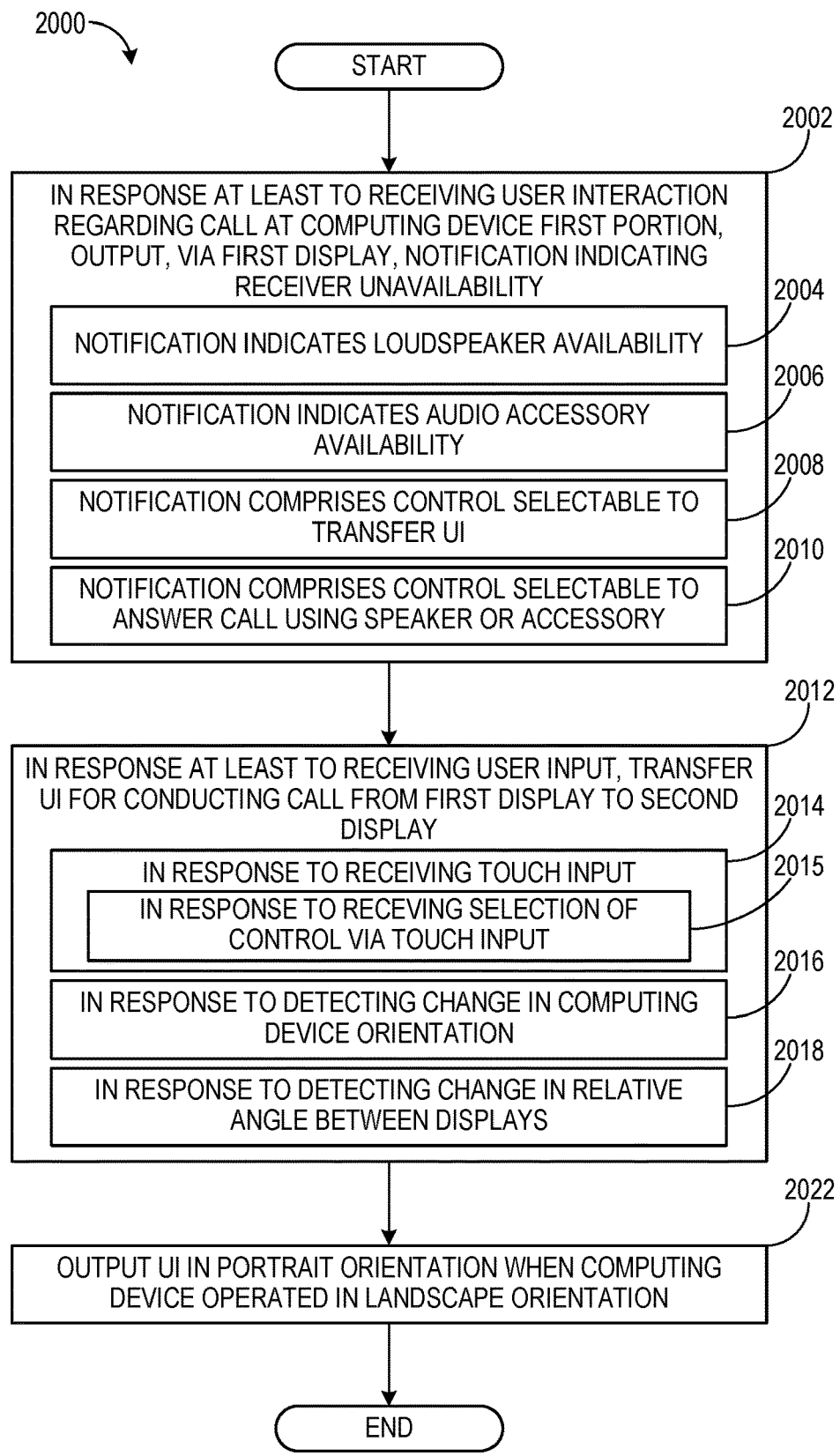
FIG. 20 shows a flowchart illustrating a method of transferring a UI for conducting a phone call from a first display of a computing device to a second display of the computing device.

FIG. 20 shows a flowchart illustrating a method 2000 of transferring a UI for conducting a phone call from a first display of a computing device to a second display of the computing device. Method 2000 may be implemented on computing device 100, for example.

At 2002, method 2000 includes, in response at least to receiving user interaction regarding a phone call at a first portion of the computing device, output, via the first display, a notification indicating that a telephone receiver of the computing device is unavailable when conducting the phone call using the first display as an active display. For example, the user interaction may include answering the call using the first display as the active display. The notification may indicate 2004 that a loudspeaker of the computing device is available when conducting the phone call using the first display as the active display. The loudspeaker may be provided at the first portion of the computing device for conducting phone calls over speaker, for example. The notification alternatively or additionally may indicate 2006 that an audio accessory coupled to the computing device is available when conducting the phone call using the first display as the active display. The notification may comprise 2010 a control selectable to answer the call using the speaker or the audio accessory coupled to the computing device when conducting the phone call using the first display as the active display. The notification further may comprise 2008 a control selectable to transfer a UI for conducting the call from the first display to the second display.

At 2012, method 2000 includes, in response at least to receiving a user input, transferring the UI for conducting the call from the first display to the second display. Transferring the UI may include transferring the UI at least in response to receiving 2014 a touch input. Transferring the UI may include transferring the UI at least in response to receiving 2015 a selection of a control via the touch input. For example, the control may be displayed in the notification output at 2002. In another example, the touch input may be applied to a confirmation UI, where the touch input is interpreted as confirmation of user intent to transfer the UI between displays. Transferring the UI alternatively or additionally may include transferring the UI in response to detecting 2016 a change in an orientation of the computing device. For example, the change in the orientation of the computing device may be effected by user manipulation that flips the computing device, thereby switching from the first display being the active display to the second display being the active display. Transferring the UI alternatively or additionally may include transferring the UI in response to detecting 2018 a change in a relative angle between the first display and the second display. For example, the change in the orientation of the computing device may be effected by user manipulation that folds the portions of the computing device, thereby switching from one or both of the first display and the second display being user-facing (and active) to the second display being user-facing (and active).

At 2022, method 2000 includes outputting the UI for conducting the call in a portrait orientation when the computing device is operated in a landscape orientation or in a portrait mode.

Figure 21:
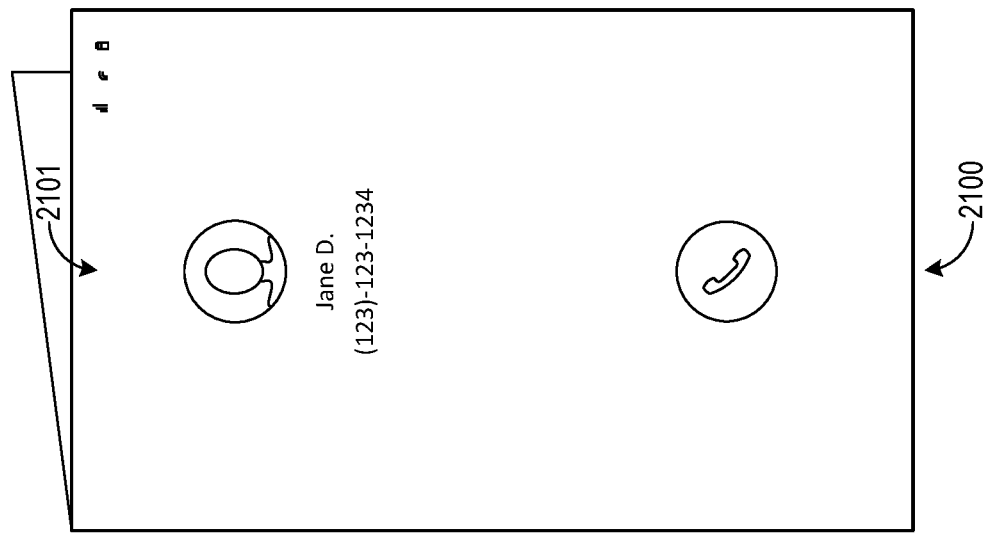
FIG. 21 illustrates the reception of an incoming call with the computing device of FIGS. 1A-1B in standby.
Figure 21:
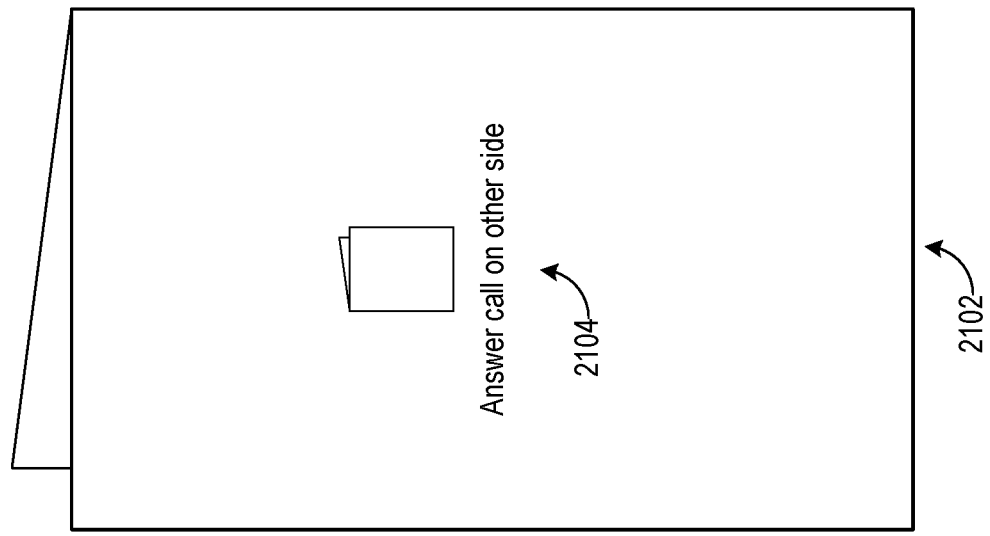

FIG. 21 illustrates the reception of an incoming call with computing device 100 in standby. In standby, certain devices and/or functions of computing device 100 may be disabled, such as first and second displays 106 and 108. Reception of the incoming call may cause computing device 100 to exit standby and enter a normal mode of operation in which at least one display is active. As indicated at 2100, and with computing device 100 in the normal mode, a calling UI 2101 regarding the incoming call is output on second display 108. In some examples, where computing device 100 is in standby and flip mode, a calling UI regarding an incoming call may be displayed on second display 108—the receiver-side display—regardless of which display was previously used or was last active. As indicated at 2102, a message 2104 is output on first display 106 that instructs a user to switch to the receiver-side display. Where first display 106—the non-receiver-side display—is active while the incoming call is received, a calling UI may be displayed on the first display.

Figure 22A:
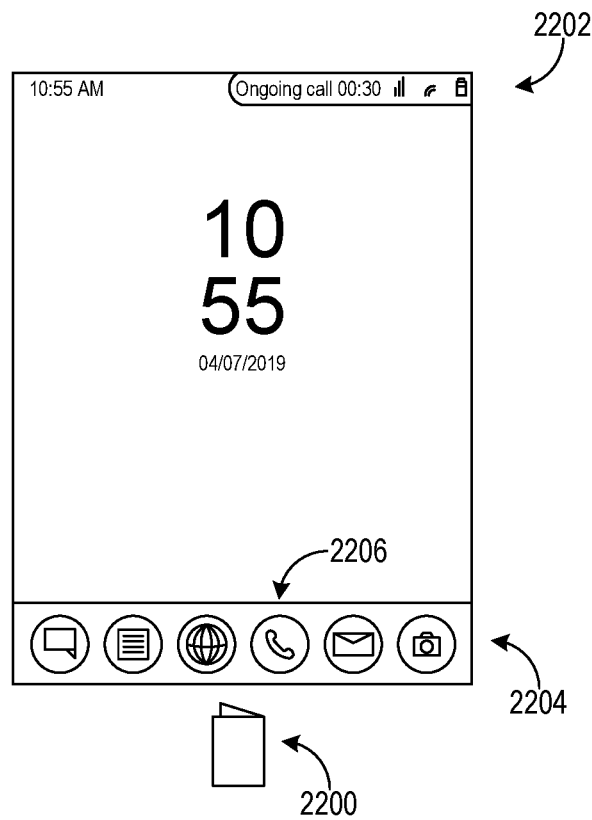
FIGS. 22A-22D illustrate the display of a pinned app bar based on the pose of the computing device of FIGS. 1A-1B.
Figure 22B:
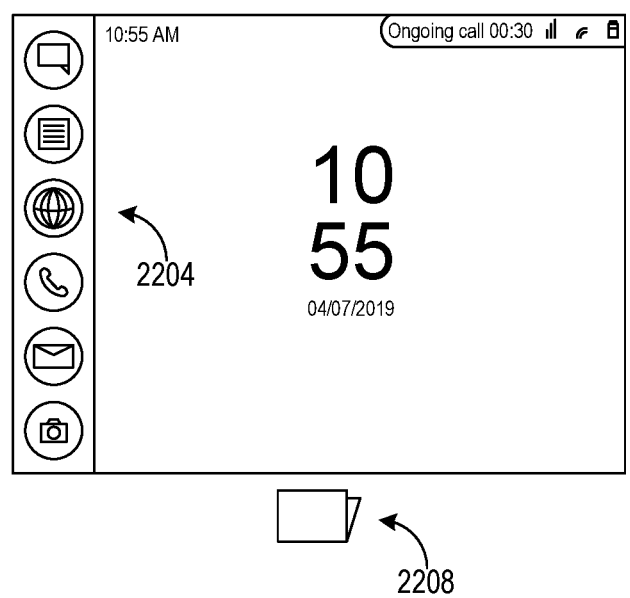

As described by way of the examples disclosed above, graphical output displayed on computing device 100 may be varied according to the pose of the computing device. FIGS. 22A-22D illustrate further examples of the display of graphical output based on the pose of computing device 100. In FIG. 22A, computing device 100 is operated in flip mode at the receiver side in a portrait orientation, as indicated at 2200. An ongoing call is being conducted at computing device 100, as indicated by a call status bar 2202. Further, a pinned app bar 2204 is displayed on first display 106. App bar 2204 includes various controls each selectable to execute a corresponding application, such as a control 2206 selectable to launch a dialing application (which may display one or more of the calling UIs described above, for example). In some examples, app bar 2204 may be displayed where computing device 100 is unlocked, and may be hidden where the computing device is locked. With computing device 100 in flip mode in the portrait orientation, app bar 2204 is displayed as extending across first display 106 (and not second display 108) in a horizontal direction. In FIG. 22B, computing device 100 is operated in flip mode at the receiver side in a landscape orientation, as indicated at 2208. In this pose, app bar 2204 is displayed as extending across first display 106 in a vertical direction.

Figure 22C:
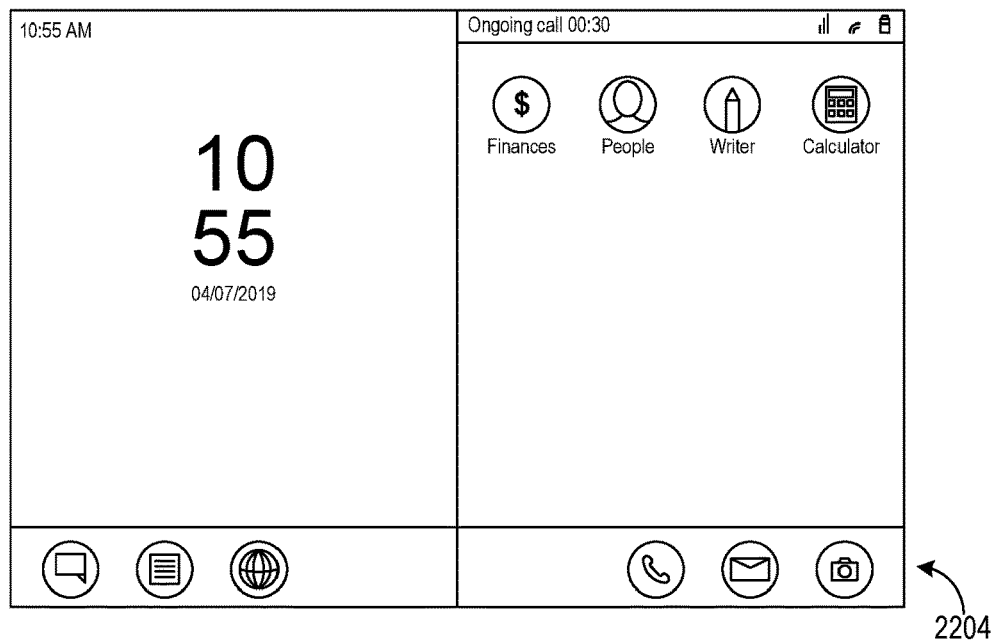
Figure 22D:
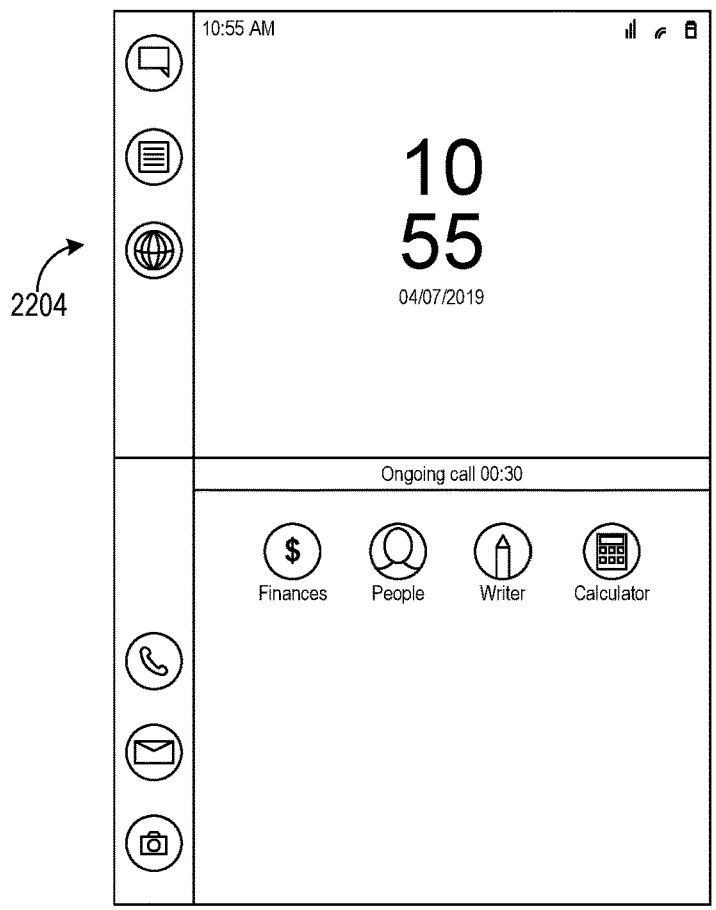

In FIG. 22C, computing device 100 is operated in double display mode in a portrait orientation. In this pose, app bar 2204 is displayed as extending across both first display 106 and second display 108 in a horizontal direction. Further, controls in app bar 204 are distributed between first and second displays 106 and 108, such that a first subset of the controls is displayed on the first display, and a second subset of the controls is displayed on the second display. In FIG. 22D, computing device 100 is operated in double display mode in a landscape orientation. In this pose, app bar 2204 is displayed as extending across both first display 106 and second display 108 in a vertical direction, with the controls of the app bar being distributed between displays.

In some embodiments, the methods and processes described herein may be tied to a computing system of one or more computing devices. In particular, such methods and processes may be implemented as a computer-application program or service, an application-programming interface (API), a library, and/or other computer-program product.

Figure 23:
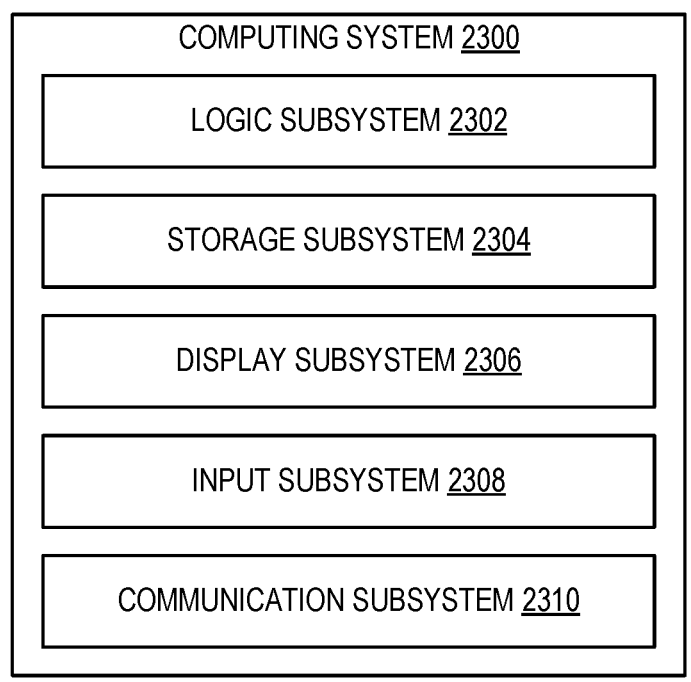
FIG. 23 shows a block diagram of an example computing system.

FIG. 23 schematically shows a non-limiting embodiment of a computing system 2300 that can enact one or more of the methods and processes described above. Computing system 2300 is shown in simplified form. Computing system 2300 may take the form of one or more personal computers, server computers, tablet computers, home-entertainment computers, network computing devices, gaming devices, mobile computing devices, mobile communication devices (e.g., smart phone), and/or other computing devices.

Computing system 2300 includes a logic subsystem 2302 and a storage subsystem 2304. Computing system 2300 may optionally include a display subsystem 2306, input subsystem 2308, communication subsystem 2310, and/or other components not shown in FIG. 23.

Logic subsystem 2302 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem may include one or more processors configured to execute software instructions. Additionally or alternatively, the logic subsystem may include one or more hardware or firmware logic subsystems configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely accessible, networked computing devices configured in a cloud-computing configuration.

Storage subsystem 2304 includes one or more physical devices configured to hold instructions executable by the logic subsystem to implement the methods and processes described herein. When such methods and processes are implemented, the state of storage subsystem 2304 may be transformed—e.g., to hold different data.

Storage subsystem 2304 may include removable and/or built-in devices. Storage subsystem 2304 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 2304 may include volatile, nonvolatile, dynamic, static, read/write, read-only, random-access, sequential-access, location-addressable, file-addressable, and/or content-addressable devices.

It will be appreciated that storage subsystem 2304 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 2302 and storage subsystem 2304 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 2300 implemented to perform a particular function. In some cases, a module, program, or engine may be instantiated via logic subsystem 1902 executing instructions held by storage subsystem 2304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 2306 may be used to present a visual representation of data held by storage subsystem 2304. This visual representation may take the form of a graphical user interface (GUI). As the herein described methods and processes change the data held by the storage subsystem, and thus transform the state of the storage subsystem, the state of display subsystem 2306 may likewise be transformed to visually represent changes in the underlying data. Display subsystem 2306 may include one or more display devices utilizing virtually any type of technology. Such display devices may be combined with logic subsystem 2302 and/or storage subsystem 2304 in a shared enclosure, or such display devices may be peripheral display devices.

When included, input subsystem 2308 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 2310 may be configured to communicatively couple computing system 2300 with one or more other computing devices. Communication subsystem 2310 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 2300 to send and/or receive messages to and/or from other devices via a network such as the Internet.

Another example provides a computing device comprising a first display, a second display, a sensor system, a logic subsystem, and a storage subsystem comprising instructions executable by the logic subsystem to output, via one or both of the first display and the second display, a notification of an incoming phone call at the computing device, and based at least on output from the sensor system indicating a relative angle between the first display and the second display being changed to an angle greater than a predetermined angle, answer the incoming phone call. In such an example, the storage subsystem may further comprise instructions executable to, in response to answering the incoming phone call, output a calling user interface for conducting the phone call via one of the first display and the second display. In such an example, the storage subsystem may comprise alternative or additional instructions executable to output the calling user interface with a first set of controls based at least on determining that the computing device is in a first pose, and output the calling user interface with a second set of controls different from the first set of controls based at least on determining that the computing device is in a second pose. In such an example, the predetermined angle may be a first predetermined angle, and the storage subsystem may comprise alternative or additional instructions executable to, based at least on output from the sensor system indicating the relative angle being changed to an angle less than a second predetermined angle, end the phone call. In such an example, the storage subsystem may comprise alternative or additional instructions executable to, based at least on output from the sensor system indicating the relative angle being changed to an angle less than the second predetermined angle and an audio accessory being coupled to the computing device, maintain the phone call. In such an example, the storage subsystem may comprise alternative or additional instructions executable to output, via one of the first display and the second display, a status bar indicating an ongoing status of the phone call. In such an example, the storage subsystem may comprise alternative or additional instructions executable to, based at least on outputting a calling user interface via the first display, output the status bar extending along a portion of a width of the first display, and, based at least on outputting the calling user interface via the second display, output the status bar extending along a substantial entirety of a width of the second display.

Another example provides, at a computing device, a method, comprising receiving an incoming call, based at least on output from a sensor system of the computing device indicating a first relative angle between a first display of the computing device and a second display of the computing device, causing operation of the computing device in a peek mode in which an outer edge portion of one of the first display and the second display is active, the peek mode displaying a first calling user interface, and based at least on output from the sensor system indicating a second relative angle between the first display and the second display, causing operation of the computing device in a two-display mode in which both of the first display and the second display are active, the second relative angle being greater than the first relative angle, and the two-display mode displaying a second calling user interface that is different than the first calling user interface. In such an example, the first calling user interface may vary in size as the first relative angle changes. In such an example, the second calling user interface may be displayed on the second display. In such an example, the second calling user interface alternatively or additionally may comprise one or more of a control selectable to screen the incoming call, a control selectable to reply to a caller associated with the incoming call with a predetermined text message, and a control selectable to answer or reject the incoming call.

Another example provides a computing device comprising a first portion comprising a first display and a speaker, a second portion comprising a second display and a telephone receiver, a sensor system, a logic subsystem, and a storage subsystem comprising instructions executable by the logic subsystem to in response at least to receiving user interaction regarding a phone call at the first portion, output, via the first display, a notification indicating that the telephone receiver is unavailable when conducting the phone call using the first display as an active display, and in response at least to receiving a user input, transfer a user interface for conducting the phone call from the first display to the second display. In such an example, the notification alternatively or additionally may indicate that the speaker is available when conducting the phone call using the first display as the active display. In such an example, the notification alternatively or additionally may indicate that an audio accessory coupled to the computing device is available when conducting the phone call using the first display as the active display. In such an example, the storage subsystem may further comprise instructions executable to transfer the user interface from the first display to the second display in response to at least receiving a touch input. In such an example, the storage subsystem may comprise additional or alternative instructions executable to transfer the user interface from the first display to the second display in response to detecting a change in an orientation of the computing device. In such an example, the storage subsystem may comprise additional or alternative instructions executable to transfer the user interface from the first display to the second display in response to detecting a change in a relative angle between the first display and the second display. In such an example, the notification alternatively or additionally may comprise a control selectable to transfer the user interface from the first display to the second display, and wherein the user input comprises a selection of the control. In such an example, the notification alternatively or additionally may comprise a control selectable to answer the phone call using the speaker or an audio accessory coupled to the computing device when conducting the phone call using the first display as the active display. In such an example, the storage subsystem may comprise additional or alternative instructions executable to output the user interface in a portrait orientation when the computing device is operated in a landscape orientation.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. At a computing device comprising a first display and a second display connected by a hinge that allows a relative angle between the first display and the second display to be adjusted, the first display and the second display being out of view when the computing device is fully closed, a method, comprising:
receiving an incoming call when the computing device is fully closed;
based at least on output from a sensor system of the computing device indicating a first relative angle between the first display of the computing device and the second display of the computing device, causing operation of the computing device in a peek mode in which an outer edge portion of one of the first display and the second display is active, a remaining portion of the one of the first display and the second display is inactive, and the other of the first display and the second display is inactive, the peek mode displaying a first calling user interface; and
based at least on output from the sensor system indicating a second relative angle between the first display and the second display, causing operation of the computing device in a two-display mode in which both of the first display and the second display are active, the second relative angle being greater than the first relative angle, and the two-display mode displaying a second calling user interface that is different than the first calling user interface.

2. The method of claim 1, wherein the first calling user interface varies in size as the first relative angle changes.

3. The method of claim 1, wherein the second calling user interface is displayed on the second display.

4. The method of claim 1, wherein the second calling user interface comprises one or more of a control selectable to screen the incoming call, a control selectable to reply to a caller associated with the incoming call with a predetermined text message, and a control selectable to answer or reject the incoming call.

5. A computing device, comprising:
a first portion comprising a first display;
a second portion comprising a second display, the first portion and the second portion connected by a hinge that allows a relative angle between the first display and the second display to be adjusted, the first display and the second display being out of view when the computing device is fully closed;
a sensor system;
a logic subsystem; and
a storage subsystem comprising instructions executable by the logic subsystem to
receive an incoming call when the computing device is fully closed;

based at least on output from the sensor system of the computing device indicating a first relative angle between the first display of the computing device and the second display of the computing device, cause operation of the computing device in a peek mode in which an outer edge portion of one of the first display and the second display is active, a remaining portion of the one of the first display and the second display is inactive, and the other of the first display and the second display is inactive, the peek mode displaying a first calling user interface; and based at least on output from the sensor system indicating a second relative angle between the first display and the second display, cause operation of the computing device in a two-display mode in which both of the first display and the second display are active, the second relative angle being greater than the first relative angle, and the two-display mode displaying a second calling user interface that is different than the first calling user interface.

6. The computing device of claim 5, wherein the instructions are executable to the first calling user interface varies in size as the first relative angle changes.

7. The computing device of claim 5, wherein the instructions are executable to display the second calling user interface on the second display.

8. The computing device of claim 5, wherein the second calling user interface comprises one or more of a control selectable to screen the incoming call, a control selectable to reply to a caller associated with the incoming call with a predetermined text message, and a control selectable to answer or reject the incoming call.

\* \* \* \* \*